United States Patent
Komatsu et al.

(10) Patent No.: US 10,834,292 B2
(45) Date of Patent: Nov. 10, 2020

(54) IMAGE PROCESSING APPARATUS, IMAGE PROCESSING METHOD, AND NON-TRANSITORY COMPUTER-READABLE STORAGE MEDIUM

(71) Applicants: Manabu Komatsu, Tokyo (JP); Hideki Hashimoto, Tokyo (JP); Masamoto Nakazawa, Kanagawa (JP)

(72) Inventors: Manabu Komatsu, Tokyo (JP); Hideki Hashimoto, Tokyo (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/409,135

(22) Filed: May 10, 2019

(65) Prior Publication Data

US 2019/0387131 A1    Dec. 19, 2019

(30) Foreign Application Priority Data

Jun. 19, 2018  (JP) .................................. 2018-116372

(51) Int. Cl.
*H04N 1/60* (2006.01)
*H04N 1/00* (2006.01)

(52) U.S. Cl.
CPC ....... *H04N 1/6044* (2013.01); *H04N 1/00819* (2013.01); *H04N 1/6025* (2013.01); *H04N 1/6094* (2013.01)

(58) Field of Classification Search
CPC .............................. G03G 15/01; H04N 1/6008
See application file for complete search history.

(56) References Cited

U.S. PATENT DOCUMENTS

| | | | |
|---|---|---|---|
| 5,678,135 A | 10/1997 | Fukui et al. | |
| 5,809,366 A * | 9/1998 | Yamakawa | H04N 1/407 358/519 |
| 8,031,381 B2 * | 10/2011 | Yotsuyanagi | H04N 1/00681 347/104 |
| 2016/0234403 A1* | 8/2016 | Watanabe | H04N 1/6033 |
| 2017/0353613 A1* | 12/2017 | Morikawa | H04N 1/00795 |
| 2018/0013926 A1* | 1/2018 | Yamaguchi | G06T 7/90 |
| 2018/0198958 A1* | 7/2018 | Yoshida | H04N 1/6008 |

FOREIGN PATENT DOCUMENTS

| | | |
|---|---|---|
| JP | 2015-133653 | 7/2015 |
| JP | 2016-039501 | 3/2016 |
| JP | 2018-157413 | 10/2018 |

* cited by examiner

*Primary Examiner* — King Y Poon
*Assistant Examiner* — Michael Burleson
(74) *Attorney, Agent, or Firm* — Oblon, McClelland, Maier & Neustadt, L.L.P.

(57) ABSTRACT

An image processing apparatus includes an image forming device, a reading device, and circuitry. The image forming device is configured to form a first pattern on a recording medium. The first pattern includes a plurality of patches in a plurality of tones. The reading device is configured to read the first pattern. The circuitry is configured to acquire read data of the first pattern from the reading device. The read data includes red, green, and blue (RGB) color space values. The circuitry is further configured to: correct the read data based on information indicating a relationship between a color and a position in the first pattern to reduce variation in readings due to a read position of the first pattern; convert the read data corrected into device-independent data; and adjust a color reproduction characteristic of the image forming device based on the device-independent data.

11 Claims, 20 Drawing Sheets

FIG. 4

<CORRECTION CONTROL POINTS>

| ID | C | M | Y | K |
|---|---|---|---|---|
| 0 | 0 | 0 | 0 | 0 |
| 1 | 0 | 0 | 64 | 0 |
| 2 | 0 | 0 | 128 | 0 |
| 3 | 0 | 0 | 192 | 0 |
| 4 | 0 | 0 | 255 | 0 |
| 5 | 0 | 64 | 64 | 0 |
| 6 | 0 | 128 | 128 | 0 |
| ⋮ | ⋮ | ⋮ | ⋮ | ⋮ |
| n−1 | 255 | 255 | 192 | 0 |
| n | 255 | 255 | 255 | 0 |

FIG. 7

<PATCH GROUP>

| PATCH NO. | H | S | L | K | |
|---|---|---|---|---|---|
| 0 | H0 | S0 | L0 | K0 | ~31 |
| 1 | H0 − α | S0 | L0 | K0 | ~32 |
| 2 | H0 + α | S0 | L0 | K0 | ~33 |
| 3 | H0 | S0 + β | L0 | K0 | ~34 |
| 4 | H0 | S0 − β | L0 | K0 | ~35 |

FIG. 11

⟨CORRECTION PARAMETERS⟩

| ID | INPUT | | | | OUTPUT | | | |
|---|---|---|---|---|---|---|---|---|
|  | C | M | Y | K | C | M | Y | K |
| 0 | 0 | 0 | 0 | 0 | 0 | 0 | 0 | 0 |
| 1 | 0 | 0 | 72 | 0 | 0 | 1 | 67 | 0 |
| 2 | 0 | 0 | 129 | 0 | 0 | 4 | 135 | 0 |
| 3 | 0 | 0 | 199 | 0 | 0 | 2 | 202 | 0 |
| 4 | 0 | 0 | 255 | 0 | 0 | 0 | 255 | 0 |
| 5 | 0 | 58 | 66 | 0 | 0 | 64 | 61 | 0 |
| 6 | 0 | 125 | 128 | 0 | 0 | 122 | 121 | 0 |
| ... | ... | ... | ... | ... | ... | ... | ... | ... |
| n−1 | 255 | 255 | 198 | 0 | 255 | 255 | 199 | 0 |
| n | 255 | 255 | 255 | 0 | 255 | 255 | 255 | 0 |

FIG. 23

<PATCH GROUP>

| PATCH NO. | C | M | Y | K | |
|---|---|---|---|---|---|
| 0 | C0 | M0 | Y0 | K0 | ~91 |
| 1 | C0 | M0 − α | Y0 + α | K0 | ~92 |
| 2 | C0 | M0 | Y0 + α | K0 | ~93 |
| 3 | C0 | M0 + α | Y0 + α | K0 | ~94 |
| 4 | C0 | M0 − α | Y0 | K0 | ~95 |
| 5 | C0 | M0 + α | Y0 | K0 | ~96 |
| 6 | C0 | M0 − α | Y0 − α | K0 | ~97 |
| 7 | C0 | M0 | Y0 − α | K0 | ~98 |
| 8 | C0 | M0 + α | Y0 − α | K0 | ~99 |

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2018-116372, filed on Jun. 19, 2018, in the Japan Patent Office, the entire disclosure of which is hereby incorporated by reference herein.

BACKGROUND

Technical Field

Embodiments of the present disclosure relate to an image processing apparatus, an image processing method, and a non-transitory computer-readable storage medium.

Related Art

Image forming devices, such as plotters or print engines, often output a color image according to color image data read and digitized by a reading device, such as a scanner. Ideally, similar color reproduction characteristics are acquired with any image forming devices. One approach to attaining common color reproduction characteristics of image forming devices involves a calibration technique of reading output images of the image forming devices and adjusting image output parameters. Examples of the calibration technique include primary color calibration, multi-color calibration, and updating of a multidimensional lookup table (LUT) called a color profile.

SUMMARY

In one embodiment of the present disclosure, a novel image processing apparatus includes an image forming device, a reading device, and circuitry. The image forming device is configured to form a first pattern on a recording medium. The first pattern includes a plurality of patches in a plurality of tones. The reading device is configured to read the first pattern. The circuitry is configured to acquire read data of the first pattern from the reading device. The read data includes red, green, and blue (RGB) color space values. The circuitry is further configured to: correct the read data based on information indicating a relationship between a color and a position in the first pattern to reduce variation in readings due to a read position of the first pattern; convert the read data corrected into device-independent data; and adjust a color reproduction characteristic of the image forming device based on the device-independent data.

Also described are novel image processing method and non-transitory, computer-readable storage medium storing computer-readable program code that causes a computer to perform the image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4 is a table of correction control points according to the first embodiment;

FIG. 7 is a table of a patch group that is arranged on the color chart according to the first embodiment;

FIG. 11 is a table of correction parameters according to the first embodiment;

FIG. 23 is a table of a patch group according to the second embodiment; and

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
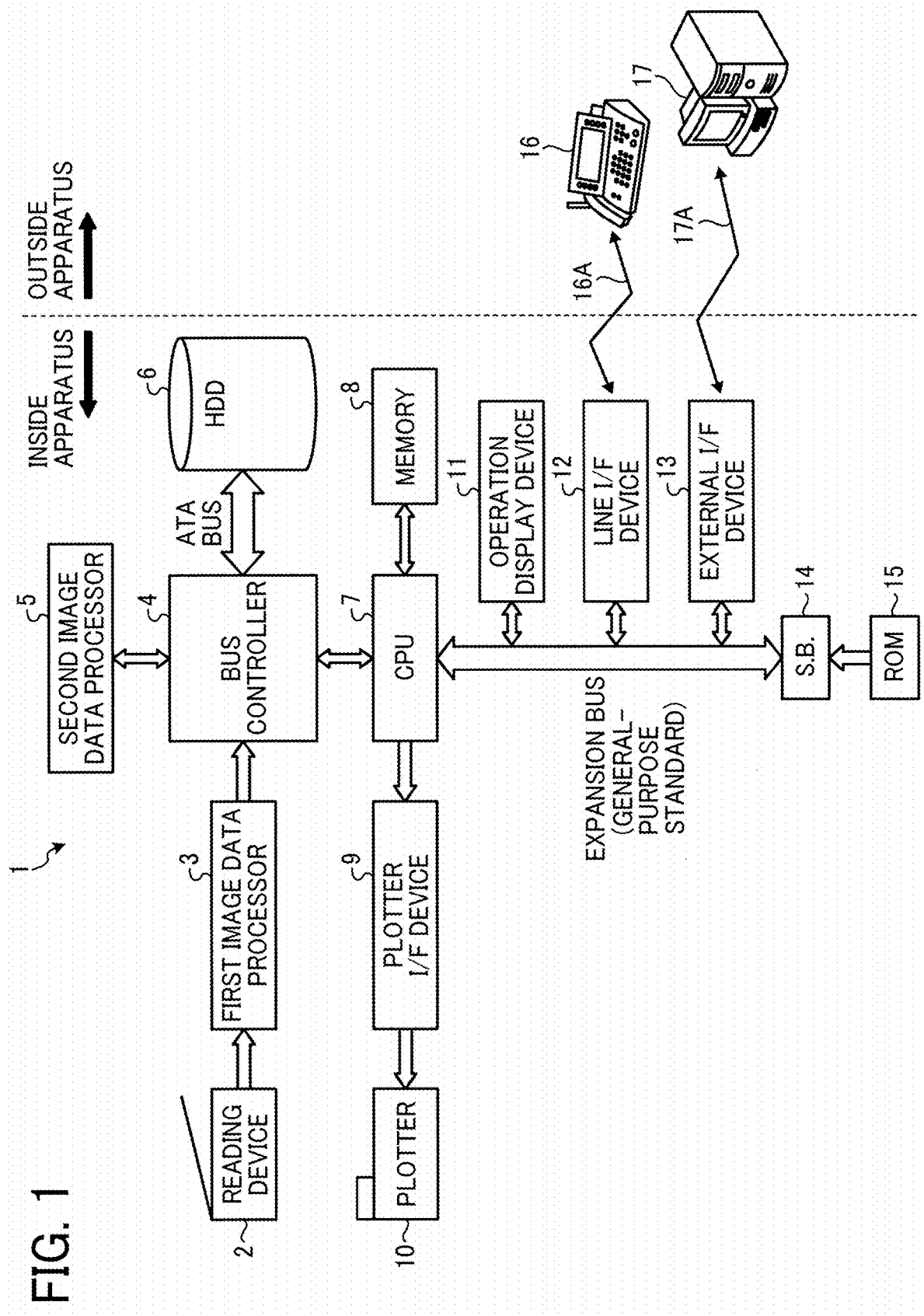
FIG. 1 is a block diagram illustrating a hardware configuration of an image processing apparatus according to a first embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes C, M, Y, and K denote colors of cyan, magenta, yellow, and black, respectively. To simplify the description, these suffixes are omitted unless necessary.

Referring to the drawings, wherein like reference numerals designate identical or corresponding parts throughout the several views, embodiments of the present disclosure are described below.

Initially, a description is given of a first embodiment of the present disclosure.

An image processing apparatus 1 of the present embodiment is, e.g., a multifunction peripheral (MFP) having at least a calibrating function. Specifically, the image processing apparatus 1 includes, e.g., a document reading function, an image processing function, and a printing function. The document reading function is a function of reading image data from a document and converting the image data read as an analog signal into digital data to output digital image data. The image processing function is a function of performing various kinds of processing including calibration on the digital image data. The printing function is a function of printing an image on a recording medium based on the processed image data.

According to the present embodiment, the image processing apparatus 1 reads, from an original or a document, color image data of three colors, namely, red, green, and blue (RGB). The image data of red, green, and blue may be hereinafter referred to as RGB data. The image processing apparatus 1 then converts the RGB data into process color image data of four colors, namely, cyan (C), magenta (M), yellow (Y), and black (K). The image data of cyan, magenta, yellow, and black may be hereinafter referred to as CMYK data. Based on the CMYK data, the image processing apparatus 1 outputs a color image on a recording medium.

Referring now to FIG. 1, a description is given of a hardware configuration of the image processing apparatus 1.

FIG. 1 is a block diagram illustrating the hardware configuration of the image processing apparatus 1 according to the first embodiment.

In FIG. 1, the image processing apparatus 1 as an image forming apparatus includes, as internal components, a reading device 2, a first image data processor 3, a bus controller 4, a second image data processor 5, a hard disk drive (HDD) 6, a central processing unit (CPU) 7, a memory 8, a plotter interface (I/F) device 9, a plotter 10 serving as an image forming device, an operation display device 11, a line I/F device 12, an external I/F device 13, a southbridge (S.B.) 14, and a read only memory (ROM) 15. Outside the image processing apparatus 1 are a facsimile machine 16 and a personal computer (PC) 17. The facsimile machine 16 is connected to the line I/F device 12 via a telephone line 16A. The PC 17 is connected to the external I/F device 13 via a network 17A.

The reading device 2 is a scanner that acquires image data from an original or a document. In the present embodiment, a line sequential contact image sensor (CIS) scanner is a specific example of the reading device 2. The line sequential CIS scanner includes a CIS, an analog-to-digital (A/D) converter, and drive circuits that drive the CIS and the A/D converter. The CIS is constructed of a photovoltaic device and light emitting diode (LED) light sources of the three colors having wavelengths corresponding to RGB. The line sequential CIS scanner turns on the LED light sources of the three colors in sequence and line-sequentially reads a set document, thereby acquiring density information of the document. Based on the density information, the line sequential CIS scanner generates and outputs 8-bit RGB digital image data. Although the CIS is an example of an in-line sensor, the configuration of the in-line sensor is not limited to the configuration described above. Compared to a charge coupled device (CCD) method, the line-sequential CIS scanners are generally advantageous in, e.g., downsizing, power saving, cost reduction, and shortening of start-up time.

The first image data processor 3 is a device that processes the digital image data generated by the reading device 2 to unify characteristics into predetermined characteristics and outputs the digital image data thus processed. Specifically, on the digital image data from the reading device 2, the first image data processor 3 performs processing such as scanner characteristic correction (e.g., shading correction, calibration), filtering (e.g., correction of modulation transfer function (MTF) characteristics, prevention of moiré), gamma (γ) conversion (e.g., brightness adjustment), color conversion (e.g., RGB/CMYK conversion), and scaling. The first image data processor 3 is constructed of a microprocessor controlled by a given program, various logic circuits, and the like.

The second image data processor 5 performs image processing suitable for an output destination designated by, e.g., a user on the digital image data having characteristics unified by the first image data processor 3. Then, the second image data processor 5 outputs the digital image data thus processed. The second image data processor 5 has different functions depending on, e.g., copying, scanner distribution, printing, and facsimile transmission.

A description is now given of the function of the second image data processor 5 in a copying operation as an example.

The second image data processor 5 corrects the sharpness of the RGB image data unified by the first image data processor 3 (hereinafter referred to as unified RGB image data) to improve the reproducibility in the case of outputting the unified RGB image data to the plotter 10. Specifically, the second image data processor 5 sharpens and smoothes the unified RGB image data according to attribute information decoded according to a set image quality mode. For example, in a text document mode, the second image data processor 5 sharpens the unified RGB image data to clarify characters. In a photographic mode, the second image data processor 5 smoothes the unified RGB to express smooth gradation. In addition, the second image data processor 5 converts the unified RGB data into CMYK image data. Note that each of RGB of the unified RGB data is 8-bit data. Similarly, each of CMYK of the CMYK image data is 8-bit data. The CMYK construct a color space for the plotter 10. The second image data processor 5 then performs optimal color adjustment according to the attribute information decoded according to the set image quality mode. Further, the second image data processor 5 converts the size (or resolution) of the CMYK image data according to the reproduction performance of the plotter 10. Furthermore, the second image data processor 5 performs y correction (or table conversion for each of CMYK) by use of, e.g., y tables for edges and non-edges for CMYK generated in advance by the CPU 7. On the CMYK image data subjected to the y correction, the second image data processor 5 executes tone number conversion (e.g., a process using an error diffusion method) according to the gradation processing capability of the plotter 10. The second image data processor 5 is constructed of a microprocessor controlled by a given program, various logic circuits, and the like.

The HDD 6 is a large storage device for storing electronic data. In the present embodiment, the HDD 6 mainly stores digital image data and supplementary information of the digital image data. In FIG. 1, the HDD 6 is connected to the bus controller 4 through advanced technology attachment (ATA) bus connection standardized by extending integrated drive electronics (IDE).

The CPU 7 is a microprocessor that controls the entire image processing apparatus 1. The memory 8 is a volatile memory that stores data that is temporarily exchanged to absorb, e.g., a speed difference in bridging a plurality of bus standards and a processing speed difference of a connected component. In addition, the memory 8 temporarily stores, e.g., programs and intermediate processing data when the CPU 7 controls the image processing apparatus 1. For high-speed processing, the CPU 7 starts up a system with a boot program stored in the ROM 15 upon normal startup, and then executes programs loaded on the memory 8 that is accessible at high speed. A specific example of the memory 8 is a dual inline memory module (DIMM).

Upon receiving the CMYK digital image data transmitted via a general-purpose standard I/F integrated with the CPU 7, the plotter I/F device 9 performs bus bridge processing for outputting the CMYK digital image data to an I/F dedicated to the plotter 10. In response to the CMYK digital image data, the plotter 10 outputs an image on a recording medium according to the CMYK digital image data, through an electrophotographic process using a laser beam.

The S.B. 14 is a chipset used in a personal computer, for example. The southbridges are often used when establishing a CPU system including a peripheral component interconnect (PCI)-Express and an industry standard architecture (ISA) bridge. In the present embodiment, the S.B. 14 connects the CPU 7 and the ROM 15.

The ROM 15 is a memory that stores programs (including a boot program) that are executed by the CPU 7 to control the image processing apparatus 1.

The operation display device 11 is an interface between the image processing apparatus 1 and users, for example. The operation display device 11 is constructed of, e.g., a liquid crystal display (LCD), a key switch, and a touch panel. The operation display device 11 displays, on the LCD, various statuses of the image processing apparatus 1, how to use the image processing apparatus 1, and the like. The operation display device 11 also detects input instructions from the users. In the present embodiment, the operation display device 11 is connected to the CPU 7 via a PCI-Express bus.

The line I/F device 12 connects the PCI-Express bus and the telephone line 16A, thereby enabling data communication between the image processing apparatus 1 and the facsimile machine 16. The facsimile machine 16 exchanges image data with the image processing apparatus 1 via the telephone line 16A.

The external I/F device 13 connects the PCI-Express bus and an external device, thereby enabling data communication between the image processing apparatus 1 and the external device. In the present example, the external I/F device 13 is connected to the network 17A such as Ethernet (registered trademark). Via installed application software or drivers, the PC 17 transmits a request, an instruction, and the like from, e.g., a user to the image processing apparatus 1. The PC 17 also transmits information from the image processing apparatus 1 to the user.

Note that the image data having unified characteristics transmitted from the first image data processor 3 or the external I/F device 13 is encoded by the CPU 7 and then stored in the HDD 6. The encoded image data is decoded and converted in processing performed by the first image data processor 3 and other components at later stages. The RGB image data having unified characteristics is processed at a high compression rate by, e.g., irreversible Joint Photographic Experts Group (JPEG) coding. On the other hand, the supplementary information is processed by, e.g., reversible K8 coding. Accordingly, the impairment in image quality is prevented.

The programs for controlling the first image data processor 3, the second image data processor 5, and the CPU 7 may be recorded on or stored in a computer-readable recording or storage medium, such as a compact disc read-only memory (CD-ROM), a flexible disk (FD), a compact disc recordable (CD-R), or a digital versatile disk (DVD), in a file in installable or executable format. Thus, the programs are providable. Alternatively, the programs may be stored in a computer connected to a network such as the Internet and downloaded via the network, thus being providable. Alternatively, the programs may be provided or distributed via a network.

Figure 2:
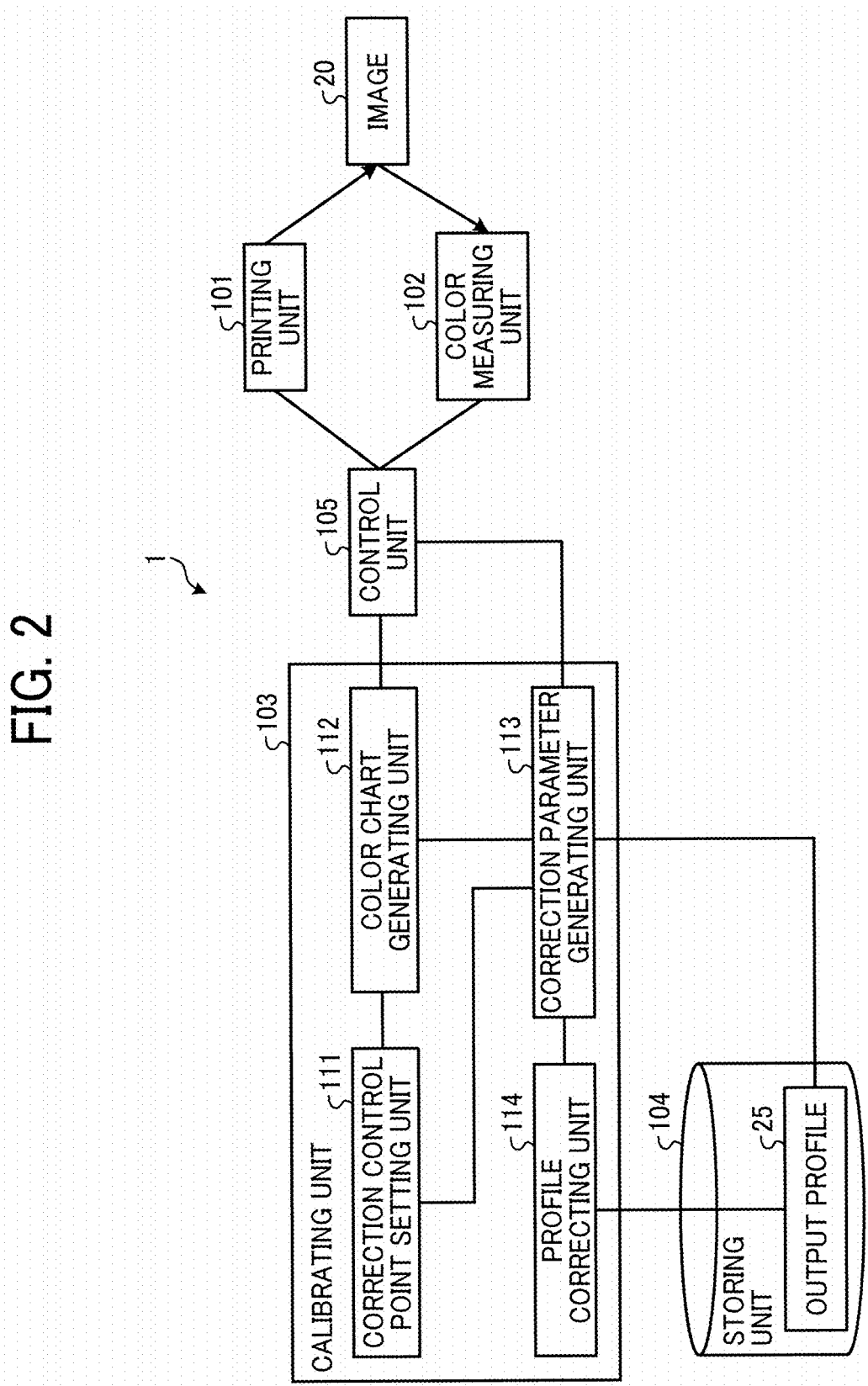
FIG. 2 is a block diagram illustrating a functional configuration of the image processing apparatus according to the first embodiment.

Referring now to FIG. 2, a description is given of a functional configuration of the image processing apparatus 1.

FIG. 2 is a block diagram illustrating the functional configuration of the image processing apparatus 1 according to the first embodiment.

The image processing apparatus 1 includes a printing unit 101, a color measuring unit 102, a calibrating unit 103 serving as an adjusting unit, a storing unit 104, and a control unit 105.

The printing unit 101 prints an image 20 on a recording medium. The printing unit 101 is implemented by a cooperation of, e.g., the plotter 10, and the plotter I/F device 9.

The color measuring unit 102 measures color of the image 20 printed by the printing unit 101. The color measuring unit 102 is implemented by a cooperation of, e.g., the reading device 2, the first image data processor 3, and the CPU 7.

The calibrating unit 103 performs color calibration to maintain color reproducibility according to the characteristics of the printing unit 101. Based on a result of color measurement by the color measuring unit 102, the calibrating unit 103 corrects an output profile 25 stored in the storing unit 104. The output profile 25 is used for the RGB/CMYK conversion process, for example. The calibrating unit 103 is implemented by a cooperation of, e.g., the second image data processor 5, and the CPU 7. The storing unit 104 is implemented by a cooperation of, e.g., the HDD 6, and the CPU 7.

The control unit 105 controls the printing unit 101, the color measuring unit 102, and the calibrating unit 103 to exchange data. The control unit 105 is implemented by a cooperation of, e.g., the CPU 7, the memory 8, and the bus controller 4.

The calibrating unit 103 includes a correction control point setting unit 111, a color chart generating unit 112, a correction parameter generating unit 113, and a profile correcting unit 114.

The correction control point setting unit 111 sets a control point that is used for correcting the output profile 25. Based on the control point (hereinafter referred to as a correction control point), the color chart generating unit 112 generates data indicating a configuration of a color chart for correcting the output profile 25. The correction parameter generating unit 113 generates a correction parameter for correcting the output profile 25 by use of, e.g., the correction control point, a patch configuration of the color chart, a colorimetric value (i.e., result of color measurement by the color measuring unit 102), and the output profile 25. The profile correcting unit 114 corrects the output profile 25 by use of the correction parameter.

Figure 3:
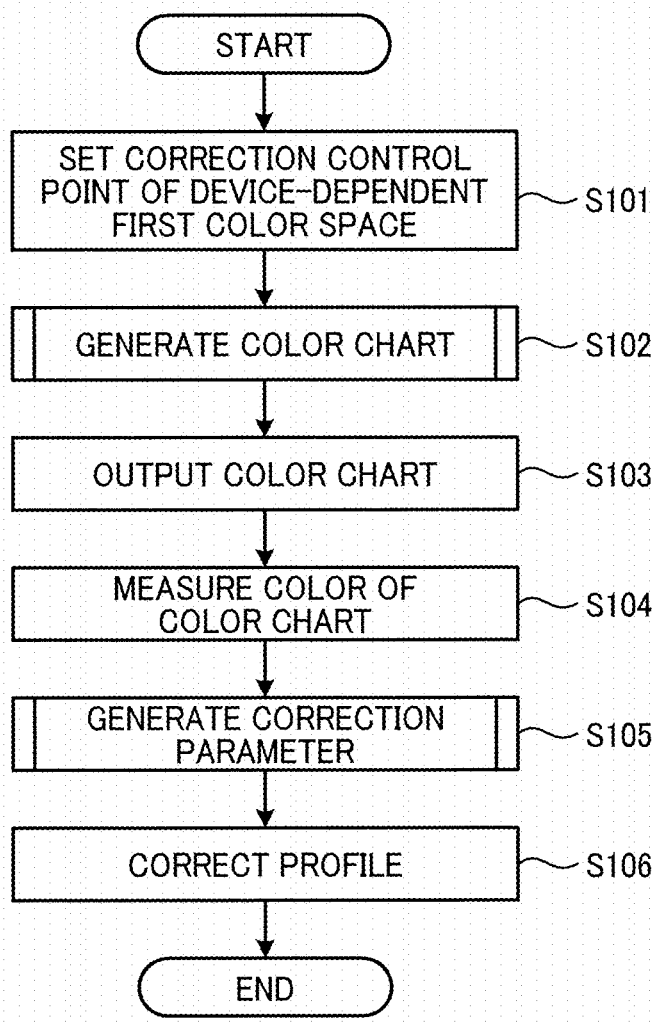
FIG. 3 is a flowchart of a process to correct an output profile according to the first embodiment.

Referring now to FIG. 3, a description is given of the correction of the output profile 25.

FIG. 3 is a flowchart of a process to correct the output profile 25 according to the first embodiment.

In step S101, the correction control point setting unit 111 sets a correction control point of a device-dependent first color space (e.g., CMYK color space depending on the characteristics of the plotter 10). In step S102, the color chart generating unit 112 generates a color chart for correcting the output profile 25, based on the correction control point. In step S103, the printing unit 101 outputs the color chart. In other words, the printing unit 101 prints the color chart on a recording medium. In step S104, the color measuring unit 102 measures color of the color chart. In step S105, the correction parameter generating unit 113 generates a correction parameter based on a Lab value of the correction control point, a Lab value of a result of the color measurement of the color chart, and CMYK values of each patch of the color chart. In step S106, the profile correcting unit 114 corrects the output profile 25 by use of the correction parameter generated.

Referring now to FIG. 4, a description is given of the correction control point.

FIG. 4 is a table of correction control points according to the first embodiment.

The correction control point setting unit 111 sets the correction control points by continuously changing tones at a hue. For example, in FIG. 4, ID0 to ID4 correspond to control points for correcting the Y-hue color. The correction control point setting unit 111 sets the correction control points for representative hues of, e.g., primary colors such as CMY, secondary colors such as RGB, and tertiary colors such as gray.

Figure 5:
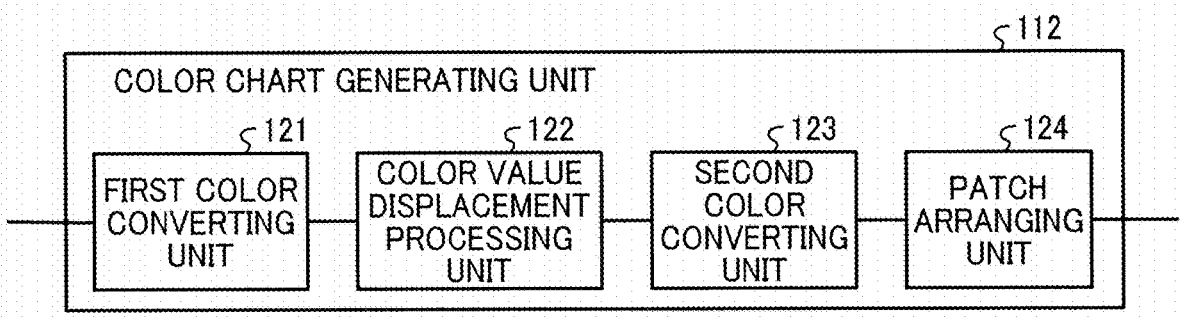
FIG. 5 is a block diagram illustrating a functional configuration of a color chart generating unit according to the first embodiment.
Figure 6:
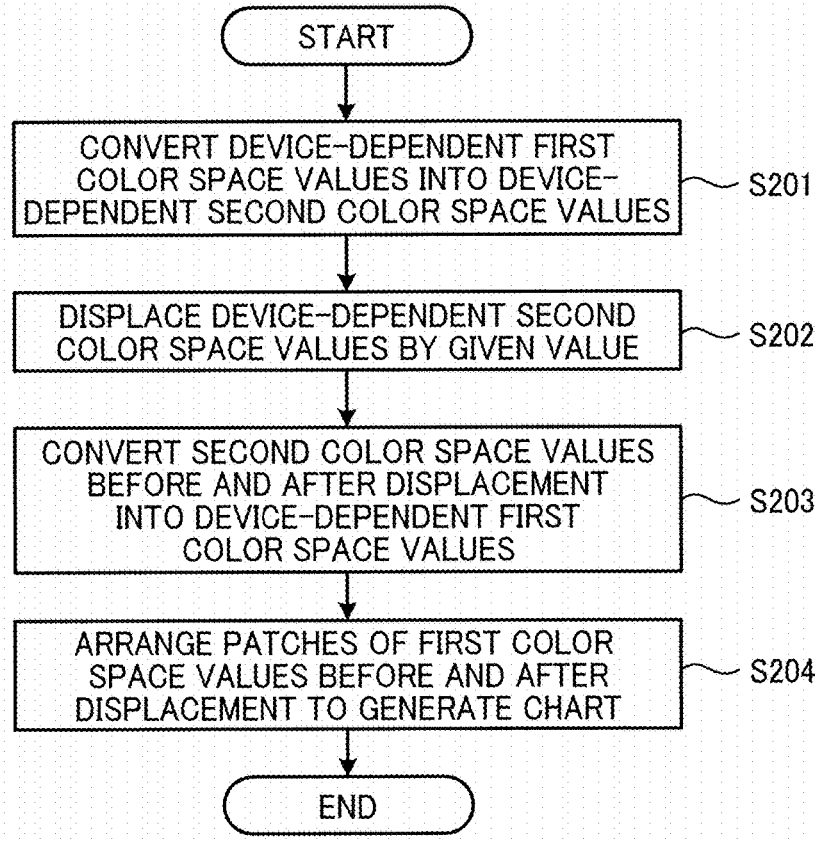
FIG. 6 is a flowchart of a process to generate a color chart according to the first embodiment.

Referring now to FIGS. 5 and 6, a description is given of the generation of a color chart.

FIG. 5 is a block diagram illustrating a functional configuration of the color chart generating unit 112 according to the first embodiment.

The color chart generating unit 112 includes a first color converting unit 121, a color value displacement processing unit 122, a second color converting unit 123, and a patch arranging unit 124.

The first color converting unit 121 converts CMY values among CMYK values into hue, saturation, and lightness (HSL) values. The CMYK values or CMYK color space values serve as device-dependent first color space values. The HSL values or HSL color space values serve as device-dependent second color space values.

The color value displacement processing unit 122 displaces the HSL values (i.e., conversion result) by a given displacement amount.

The second color converting unit 123 inversely converts the displaced HSL values into CMYK values.

The patch arranging unit 124 arranges patches using the CMYK values (i.e., inverse conversion result) in a page to generate a color chart.

FIG. 6 is a flowchart of a process to generate a color chart according to the first embodiment.

In step S201, the first color converting unit 121 converts CMY values among CMYK values (i.e., device-dependent first color space values) into HSL values (i.e., device-dependent second color space values). The first color converting unit 121 converts the CMY values (from 0 to 255) into the HSL values by, e.g., Formulas 1 to 14

$$C' = C/255, \quad (1)$$

$$M' = M/255, \quad (2)$$

$$Y' = Y/255, \quad (3)$$

$$R = 1.0 - C', \quad (4)$$

$$G = 1.0 - M', \quad (5)$$

$$B = 1.0 - Y', \quad (6)$$

$$\max = \mathrm{Max}(C', M', Y'), \quad (7)$$

$$\mathrm{mix} = \mathrm{Min}(C', M', Y'), \quad (8)$$

$$L = (\max + \min)/2, \quad (9)$$

$$ds = \max - \min, \quad (10)$$

$$S = \begin{cases} ds/(\max + \min), & L \leq 0.5 \\ ds/(2 - \max - \min), & \text{else} \end{cases}, \quad (11)$$

$$tmp\{C', M', Y'\} = (\max - \{C', M', Y'\})/ds, \quad (12)$$

$$h = \begin{cases} tmp(Y') - tmp(M'), & C' = \max \\ 2 + tmp(C') - tmp(Y'), & M' = \max \\ 4 + tmp(M') = tmp(C'), & Y' = \max \end{cases} \quad (13)$$

and $$H = 60 \times h. \quad (14)$$

In step S202, the color value displacement processing unit 122 displaces, by a given value, the HSL values (i.e., device-dependent second color space values) thus obtained by the conversion. The given value may be determined, for example, in a range from a maximum fluctuation range of the plotter 10 using the output profile 25 to be corrected to a range exceeding the maximum fluctuation range.

In step S203, the second color converting unit 123 inversely converts the HSL values (i.e., device-dependent second color space values) before and after the displacement into CMY values (i.e., device-dependent first color space values). The second color converting unit 123 converts the HSL values into the CMY values by, e.g., Formulas 15 to 30

$$\min = \begin{cases} L \times (1+S), & L \leq 0.5 \\ L + S - (L \times S), & \text{else} \end{cases}, \quad (15)$$

$$\max = 2 \times L - \min, \quad (16)$$

$$R = G = B = 0, \text{ if } S = 0, \quad (17)$$

$$H_r = H' + 120, \quad (18)$$

$$H_g = H', \quad (19)$$

$$H_b = H' - 120, \quad (20)$$

$$val(h) = \begin{cases} \min + (\max - \min) \times h/60, & \text{if } h < 60 \\ \max, & \text{else if } h < 120 \\ \min + (\max - \min) \times (240 - h)/60, & \text{else if } h < 240 \\ \min, & \text{else} \end{cases} \quad (21)$$

$$R = val(H_r), \quad (22)$$

$$G = val(H_g), \quad (23)$$

$$B = val(H_b), \quad (24)$$

$$C' = 1.0 - R, \quad (25)$$

$$M' = 1.0 - G, \quad (26)$$

$$Y' = 1.0 - B, \quad (27)$$

$$C = C' \times 255, \quad (28)$$

$$M = M' \times 255 \quad (29)$$

and $$Y = Y' \times 255. \quad (30)$$

As for K, the original value remains unchanged.

In step S204, the patch arranging unit 124 arranges, in a page, patches of the CMY values (i.e., first color space values) before and after the displacement, to generate a color chart.

Referring now to FIG. 7, a description is given of a patch group.

FIG. 7 is a table of a patch group that is arranged on the color chart according to the first embodiment.

In FIG. 7, the "Patch No." column indicates patch numbers for each correction control point. Each of rows 31 to 35 indicates color values, in the HSL space, of a patch output for each correction control point. FIG. 7 illustrates five patches constructed of one patch with original color values and four patches obtained by displacing one of H0, S0, and L0, which are conversion results of each correction control point, by a % (i.e., given displacement percentage) in a positive or negative direction of a hue H direction or by 13% (i.e., given displacement percentage) in a positive or negative direction of a saturation S direction. Arranged in the color chart are patches each being constructed of K0, which is an original color value of K, and the CMY values into which the HSL values are inversely converted.

Figure 8:
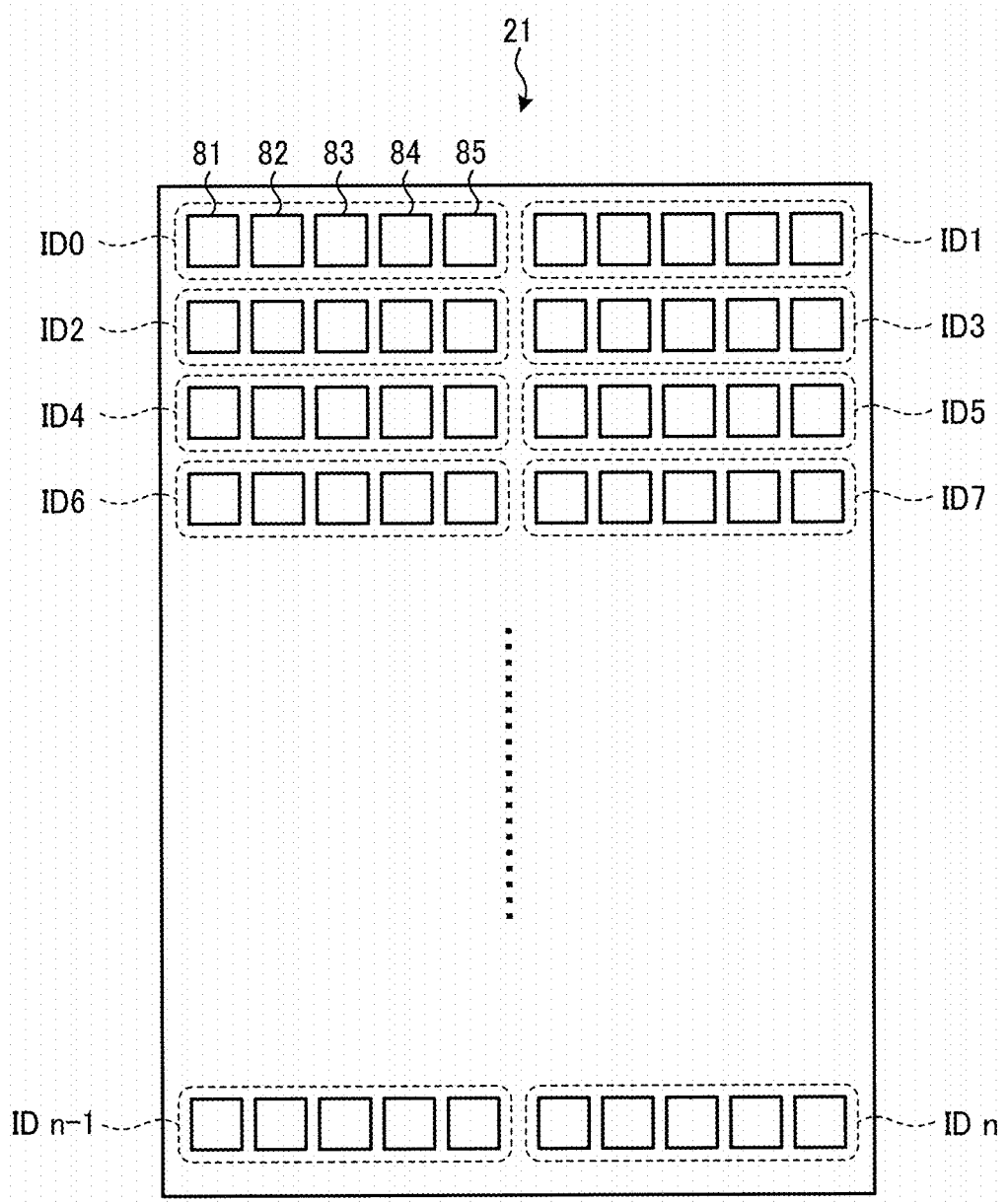
FIG. 8 is a view of an example of the color chart according to the first embodiment.

Referring now to FIG. 8, a description is given of a configuration of a color chart.

FIG. 8 is a view of a color chart 21 as an example of the color chart according to the first embodiment.

The color chart 21 is an example of the image 20 printed on a recording medium by the printing unit 101. The color chart 21 includes a plurality of patches in a plurality of tones. The color chart 21 illustrated in FIG. 8 includes patch groups ID0 to IDn corresponding to the correction control points as illustrated in FIG. 4. Each of the patch groups ID0 to IDn includes five patches 81 to 85 corresponding to the rows 31 to 35, respectively, illustrated in FIG. 7.

Figure 9:
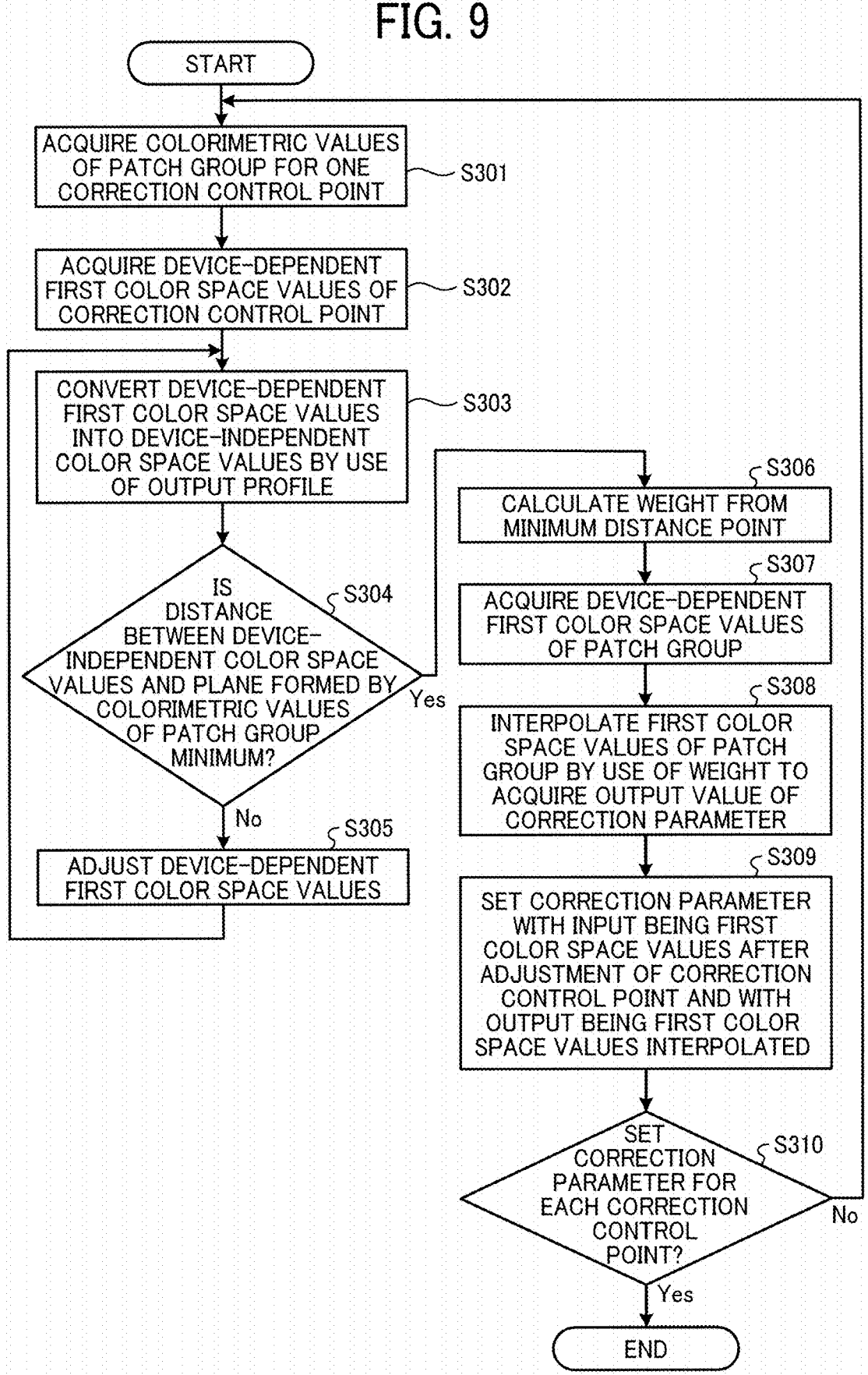
FIG. 9 is a flowchart of a process to generate a correction parameter according to the first embodiment.
Figure 10:
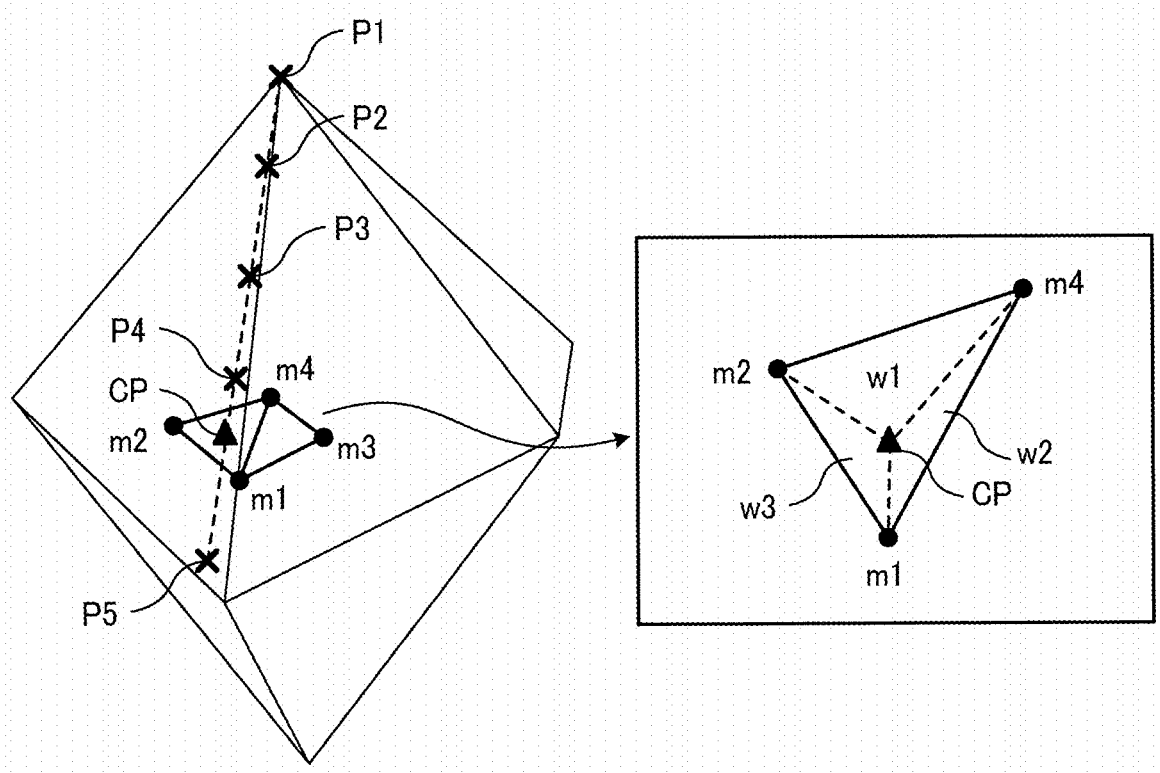
FIG. 10 is a diagram conceptually illustrating an example of generation of the correction parameter according to the first embodiment.

Referring now to FIGS. 9 to 11, a description is given of the generation of a correction parameter.

FIG. 9 is a flowchart of a process to generate a correction parameter according to the first embodiment.

In step S301, the correction parameter generating unit 113 acquires colorimetric values of the patch groups ID0 to IDn for one correction control point, based on the Commission internationale de l'éclairage (CIE) XYZ color space values indicating the result of color measurement of the color chart 21 output from the color measuring unit 102.

In step S302, the correction parameter generating unit 113 acquires CMYK values (i.e., device-dependent first color space values) of the correction control point.

In step S303, the correction parameter generating unit 113 converts the CMYK values into Lab values (i.e., device-independent color space values) by use of the output profile 25.

In step S304, the correction parameter generating unit 113 determines whether a distance (or color difference distance) between the Lab values (i.e., device-independent color space values) and a plane formed by colorimetric values of the patch group is minimum.

When the color difference distance is not the minimum (NO in step S304), the correction parameter generating unit 113 adjusts the CMYK values (i.e., device-dependent first color space values) in step S305. Specifically, when the lightness is higher than the plane formed by the colorimetric values of the patch group, the correction parameter generating unit 113 increases the CMYK values, thereby decreasing the lightness. On the other hand, when the lightness is lower than the plane formed by the colorimetric values of the patch group, the correction parameter generating unit 113 decreases the CMYK values, thereby increasing the lightness.

After executing the step S305, the correction parameter generating unit 113 executes the step S303 again.

On the other hand, when the color difference distance is the minimum (YES in step S304), the correction parameter generating unit 113 calculates a weight for interpolating the CMYK values of the patch group in step S306, based on the Lab value (i.e., minimum distance point) to which the color difference distance from the plane formed by the colorimetric values is the minimum.

In step S307, the correction parameter generating unit 113 acquires CMYK values (i.e., device-dependent first color space values) of the patch group measured.

In step S308, the correction parameter generating unit 113 interpolates, by use of the weight, the CMYK values of the patch group acquired, to acquire an output value of a correction parameter.

In step S309, the correction parameter generating unit 113 sets the correction parameter with an input being the CMYK values (i.e., first color space values) after adjustment of the correction control point and with an output being the CMYK values (i.e., first color space values) of the patch group interpolated.

In step S310, the correction parameter generating unit 113 determines whether input and output values of the correction parameter are set for each correction control point.

When the input and output values of the correction parameter are set for each correction control point (YES in step S310), the present flow ends. On the other hand, when setting the input and output values of the correction parameter is not completed for all the correction control points (NO in step S310), the correction parameter generating unit 113 executes the step S301 again.

FIG. 10 is a diagram conceptually illustrating an example of the generation of a correction parameter according to the first embodiment.

FIG. 10 illustrates a Lab space. Points P1 to P5 indicate Lab values into which CMYK values of correction control points are converted by use of the output profile 25. Points m1 to m4 indicate colorimetric values of a patch group for a correction control point of the point P4. Specifically, in the example illustrated in FIG. 10, the correction control point has a maximum saturation. Therefore, FIG. 10 illustrates colorimetric values of four patches, excluding a patch obtained by displacing the saturation in the positive direction.

First, the correction parameter generating unit 113 obtains a formula of a plane formed by the points m1 to m4. Specifying three points determines a formula of a three-dimensional plane. For a combination of three points, a colorimetric value of an original patch is fixed while one of patches having the hue H displaced and one of patches having the saturation S displaced are selected. Since each of the hue H and the saturation S is directed to positive and negative sides, four (i.e., 2×2) planes are formed. In the example illustrated in FIG. 10, the displacement direction of the saturation S is the negative direction alone. Therefore, two planes are formed by a combination of the points m1, m2, and m4 and a combination of the points m1, m3, and m4. Note that the points m1, m2, m3, and m4 indicate colorimetric values of colors displaced while maintaining the luminance. That is, the points m1, m2, m3 and m4 indicate close lightness values. Therefore, the two planes are nearly perpendicular to a lightness axis.

Thereafter, while moving the CMYK values from the point P4 to the point P5, the correction parameter generating unit 113 performs color conversion by use of the output profile 25 to obtain Lab values. The correction parameter generating unit 113 calculates, at any time, the distance between each Lab values and the plane to determine a point CP as a minimum distance point. That is, the distance between the point CP and the plane is the minimum. The correction parameter generating unit 113 sets the CMYK values of the minimum distance point as an input value of the correction parameter. Upon determining the point CP, the correction parameter generating unit 113 acquires the Lab values of the point CP together with the Lab values of the colorimetric values of the patches surrounding the point CP. The correction parameter generating unit 113 performs interpolation by use of weights w1, w2, and w3, which are illustrated in FIG. 10 as areas defined by lines drawn from the point CP to the points m1, m2, and m4 indicating the Lab values of the colorimetric values. Specifically, the correction parameter generating unit 113 acquires CMY values (C1, M1, Y1), (C2, M2, Y2), (C3, M3, Y3) of the points m1, m2, and m4. The correction parameter generating unit 113 performs interpolation by use of the weights w1, w2, and w3 in Formulas 31 to 33

$$C=(C1\times w1+C2\times w2+C3\times w3)/(w1+w2+w3), \quad (31)$$

$$M=(M1\times w1+M2\times w2+M3\times w3)/(w1+w2+w3) \quad (32)$$

and $$Y=(Y1\times w1+Y2\times w2+Y3\times w3)/(w1+w2+w3), \quad (33)$$

thereby acquiring an output value (C, M, Y) of the correction parameter.

As for K, since the color value of each patch is not displaced, the original value is the output value.

FIG. 11 is a table of correction parameters according to the first embodiment.

"INPUT" and "OUTPUT" respectively indicate input values and output values of correction parameters for correction control points. Note that the input values change from the values illustrated in FIG. 4 because the CMYK values are adjusted in the intersection search portion illustrated in FIG. 10.

Figure 12:
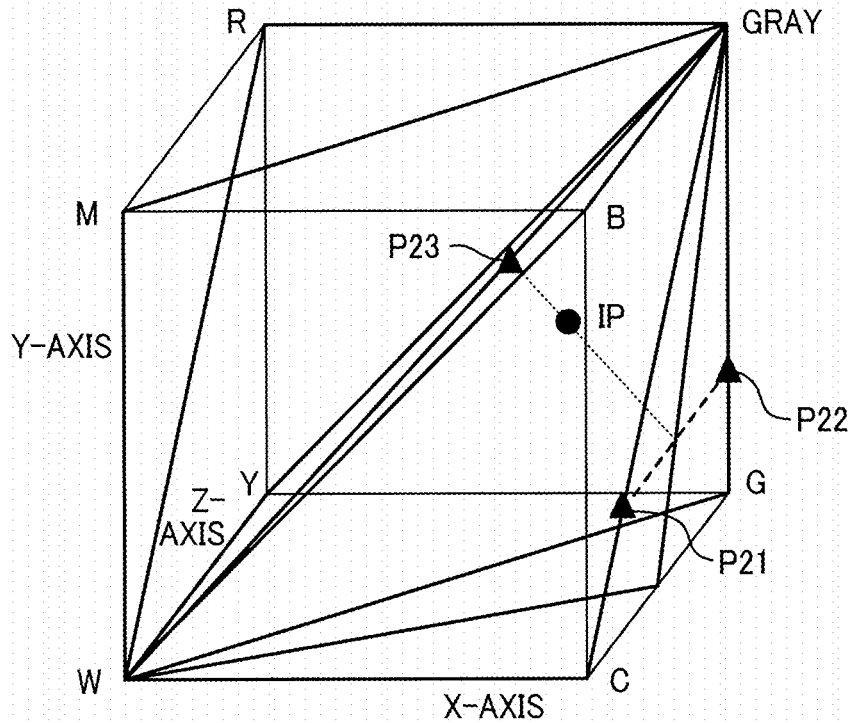
FIG. 12 is a diagram conceptually illustrating correction of an output profile according to the first embodiment.

Referring now to FIG. 12, a description is given of the correction of the output profile 25.

FIG. 12 is a diagram conceptually illustrating the correction of the output profile 25 according to the first embodiment.

FIG. 12 illustrates a color space in which the x-axis, y-axis, and z-axis indicate color values of C, M, and Y, respectively. The lower left origin corresponds to white (W); whereas the upper right apex corresponds to CMY solid gray. As a representative example, when lines of the primary color CMY, the secondary color RGB, and the tertiary color gray are set as correction control points, correction parameters are located on bold lines from a point W to a point Gray via points C, M, Y, R, G, and B and a bold, diagonal line from the point W to the point Gray.

The profile correcting unit 114 acquires CMYK values of each lattice point from a lookup table (LUT), which is the output profile 25 to be corrected. Note that, in some profiles such as International Color Consortium (ICC) profiles, gamma conversion, matrix conversion, and the like can be added before or after the LUT. In such a case, the profile correcting unit 114 performs reverse conversion to match the final output. From the magnitude relation of CMY values among the CMYK values acquired, the profile correcting unit 114 determines an area that includes a point IP, which corresponds to the color to be corrected, in the CMY color space. Based on the determination result, the profile correcting unit 114 determines parameters to use for correction (i.e., correction parameters). For example, at the point IP illustrated in FIG. 12, a relation of C>M>Y is satisfied. The profile correcting unit 114 uses correction parameters P21, P22 and P23, which are located on a C (hue)-gray line, a G (hue)-gray line, and a W-Gray line, respectively, in FIG. 12.

By use of the three correction parameters P21, P22 and P23, the profile correcting unit 114 obtains a correction value in the following procedure. First, the profile correcting unit 114 converts CMY values into HSL values. Then, the profile correcting unit 114 corrects the saturation S to 1. The profile correcting unit 114 also corrects the hue H to C-hue and G-hue values. The profile correcting unit 114 inversely converts the HSL values obtained into CMY values to apply the correction parameters. When performing correction by use of a correction parameter, the profile correcting unit 114 searches values that sandwich the CMY values to be corrected from input values (i.e., INPUT) of the correction parameter on a target control line. The profile correcting unit 114 acquires output values (i.e., OUTPUT) corresponding to the values searched. The profile correcting unit 114 uses an appropriate interpolation method such as linear interpolation or spline interpolation to output CMY values corrected.

Based on a ratio of a difference between the original hue H and a hue $H_c$ of the C-hue to a difference between the original hue H and a hue $H_g$ of the G-hue, the profile correcting unit 114 performs weighted interpolation on the corrected CMY values acquired for each of the C-hue and the G-hue by Formulas 34 to 36

$$C_{S=1} = (|H-H_c| \times C_g + |H-H_g| \times C_c)/|H_g-H_c|, \quad (34)$$

$$M_{S=1} = (|H-H_c| \times M_g + |H-H_g| \times M_c)/|H_g-H_c|, \quad (35)$$

and $$Y_{S=1} = (|H-H_c| \times Y_g + |H-H_g| \times Y_c)/|H_g-H_c|, \quad (36)$$

where $C_g$, $M_g$ and $Y_g$ are CMY values acquired by correcting the G-hue, respectively, and $C_c$, $M_c$ and $Y_c$ are CMY values acquired by correcting the C-hue, respectively. Similarly, after correcting the saturation S to 1, the profile correcting unit 114 performs correction by use of a W-Gray correction parameter to acquire $C_{S=0}$, $M_{S=0}$, and $Y_{S=0}$. Then, the profile correcting unit 114 interpolates $C_{S=1}$, $M_{S=1}$, $Y_{S=0}$, $C_{S=1}$, $M_{S=0}$, and $Y_{S=0}$ with the saturation S by Formulas 37 to 39

$$C = \{(1-S) \times C_{S=0} + S \times C_{S=1}\}, \quad (37)$$

$$M = \{(1-S) \times M_{S=0} + S \times M_{S=1}\} \quad (38)$$

and $$Y = \{(1-S) \times Y_{S=0} + S \times Y_{S=1}\} \quad (39)$$

to acquire final corrected values CMY.

As for K, a K value before correction remains unchanged.

The profile correcting unit 114 performs the correction process described above on all lattice points of the LUT. By performing the correction process described above, the profile correcting unit 114 acquires the output profile 25 with enhanced lightness correction accuracy.

Figure 13:
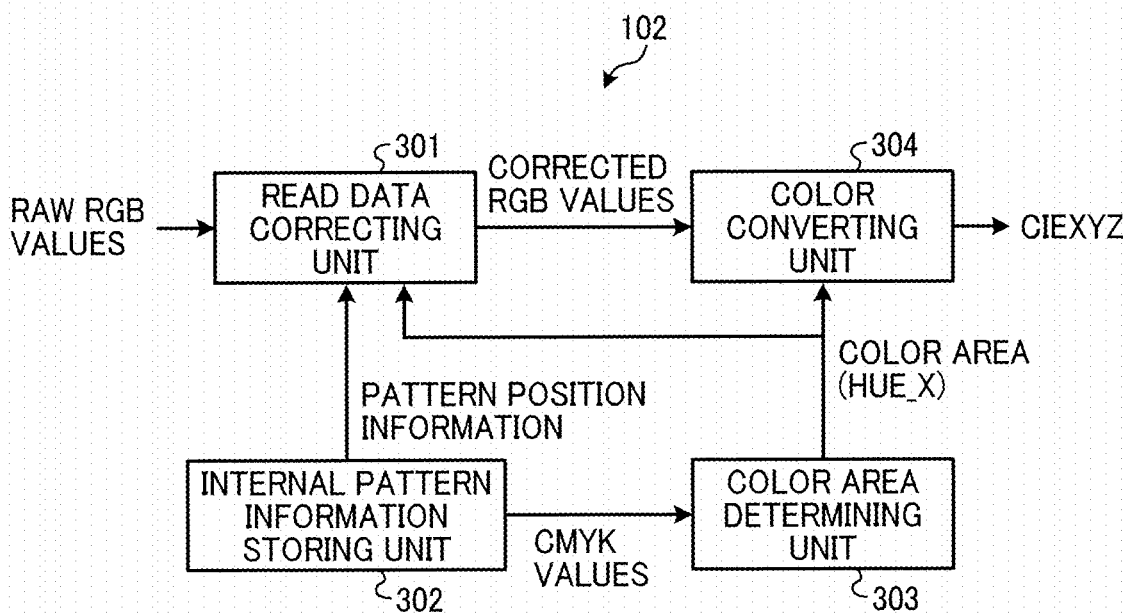
FIG. 13 is a block diagram illustrating a functional configuration of a color measuring unit according to the first embodiment.

Referring now to FIG. 13, a description is given of a read data correction process and a color conversion process.

FIG. 13 is a block diagram illustrating a functional configuration of the color measuring unit 102 according to the first embodiment.

An in-line sensor or a color scanner reads an internal pattern (i.e., first pattern), which is an example of the image 20 printed on a recording medium by the printing unit 101. The read data of the internal pattern includes RGB color space values (hereinafter simply referred to RGB values). The color measuring unit 102 corrects the read data. Then, the color measuring unit 102 converts the read data thus corrected (i.e., corrected RGB values) into device-independent CIEXYZ color space values. By use of a standard definition formula, the color measuring unit 102 converts the CIEXYZ values into CIELab values as an input color in calibration. According to the present embodiment, the color measuring unit 102 includes a read data correcting unit 301, an internal pattern information storing unit 302, a color area determining unit 303, and a color converting unit 304.

The read data correcting unit 301 performs a read data correction process of correcting, according to a read position, raw RGB values acquired as readings of the internal pattern from the in-line sensor or the like. Specifically, the raw RGB values are herein digital image data of RGB acquired by reading the internal pattern formed with process colors (i.e., CMYK) with the in-line sensor disposed in the image processing apparatus 1. The in-line sensor includes, e.g., a CIS constructed of LED light sources and a photo-voltaic device, an A/D converter, and drive circuits that drive the CIS and the A/D converter. From the density information of an image subjected to reading, the in-line sensor outputs digital image data of RGB, each being 8-bit data. At this time, shading correction or the like is performed on the digital image data so as to correct variation in readings caused by a mechanical feature (e.g., illumination distortion) of the in-line sensor.

The internal pattern information storing unit 302 stores information indicating a configuration of the internal pattern. In other words, the internal pattern information storing unit 302 stores internal pattern information indicating a relationship between a color and a position in the internal pattern. The internal pattern information includes, e.g., pattern position information and pattern color information (e.g., CMYK values). The pattern position information indicates respective positions of patterns included in the internal pattern. The pattern color information indicates a color of each pattern.

The color area determining unit 303 determines a color area corresponding to a read position of the in-line sensor, based on the CMYK values stored in the internal pattern information storing unit 302.

The color area is categorized as below, for example:
(Color Category 1: Hue_1) Primary color: single color C;
(Color Category 2: Hue_2) Primary color: single color M;
(Color Category 3: Hue_3) Primary color: single color Y;
(Color Category 4: Hue_4) Primary color: single color K;
(Color category 5: Hue_5) Secondary color: CM mixed color;
(Color Category 6: Hue_6) Secondary color: MY mixed color;
(Color Category 7: Hue_7) Secondary color: YC mixed color;
(Color Category 8: Hue_8) Secondary color: CK mixed color;
(Color Category 9: Hue_9) Secondary color: MK mixed color;
(Color Category 10: Hue_10) Secondary color: YK mixed color;
(Color Category 11: Hue_11) Tertiary color: CMY mixed color;
(Color Category 12: Hue_12) Tertiary color: CMK mixed color;
(Color Category 13: Hue_13) Tertiary color: MYK mixed color;
(Color Category 14: Hue_14) Tertiary color: YCK mixed color; and
(Color Category 15: Hue_15) Quaternary color: CMYK mixed color.

Note that the color category 15 may be further categorized according to a mixture ratio of the CMYK mixed color as $\text{MIN(CMY)}/K \geq 1.0$      (Color Category 15-1), $1.0 \geq \text{MIN(CMY)}/K > 0.75$      (Color Category 15-2), $0.75 \geq \text{MIN(CMY)}/K > 0.5$      (Color Category 15-3), $0.5 \geq \text{MIN(CMY)}/K > 0.25$      (Color Category 15-4), and $\text{MIN(CMY)}/K \leq 0.25$      (Color Category 15-5).

Based on the pattern position information stored in the internal pattern information storing unit 302 and the color area determined by the color area determining unit 303, the read data correcting unit 301 performs read data correction process on raw RGB values output from the in-line sensor. Then, the read data correcting unit 301 outputs corrected RGB values.

Based on the color area determined by the color area determining unit 303, the color converting unit 304 performs the color conversion process of converting the corrected RGB values output from the read data correcting unit 301 into CIEXYZ values.

Upon more-than-two color segmentation according to CMYK data of process colors (of a version in which preset CMYK data is not 0) that is used in mixed color calibration, the mixture ratio is calculated at an output level after the y characteristic correction of the plotter 10.

A description is now given of mixed color calibration (or chromaticity correction) with a gradation pattern.

The color chart 21, as a test chart for color stabilization control, is a gradation patch pattern of gray, which is a most significant color for color balance. The color chart 21 is constructed of gray scale patches of black (K) alone and process gray scale patches in which yellow (Y), magenta (M) and cyan (C) are mixed. In an image processor of the image processing apparatus 1, the gray scale patches of black (K) alone and the process gray scale patches having identical chromaticity are arranged in pairs. The in-line sensor detects the chromaticity of the gray scale patches of black (K) alone and the process gray scale patches. Data is fed back to a calibration table (i.e., output profile 25) so as to eliminate the color difference between the gray scale patches of black (K) alone and the process gray scale patches in pairs.

When converting corrected RGB values, which are obtained by correcting raw RGB values as readings (i.e., read data) of the in-line sensor, into device-independent CIEXYZ values or sRGB, the color converting unit 304 switches a masking coefficient for each color category based on a combination of the CMYK values of the internal pattern, thereby executing linear transformation as below. Since the color converting unit 304 herein performs color conversion on the internal pattern of discrete CMYK values, continuity at the boundaries of color categories may not be considered. Accordingly, the masking coefficient is obtainable by the least squares method by use of RGB values and colorimetric values such as CIEXYZ values for each color category.

$$Rout = coef\_rr[Hue\_x]*Rin + coef\_rg[Hue\_x]*Gin + coef\_rb[Hue\_x]*Bin + const[Hue\_x],$$

$$Gout = coef\_gr[Hue\_x]*Rin + coef\_gg[Hue\_x]*Gin + coef\_gb[Hue\_x]*Bin + const[Hue\_x],$$

$$Bout = coef\_br[Hue\_x]*Rin + coef\_bg[Hue\_x]*Gin + coef\_bb[Hue\_x]*Bin + const[Hue\_x], \text{ and}$$

$$Kout = coef\_kr[Hue\_x]*Rin + coef\_kg[Hue\_x]*Gin + coef\_kb[Hue\_x]*Bin + const[Hue\_x],$$

where inputs are represented by:
Rin: R output of scanner (R-component reading of scanner device);
Gin: G output of scanner (G-component reading of scanner device); and
Bin: B output of scanner (B-component reading of scanner device),
outputs are represented by:
Rout: R output (standard R component: e.g., CIEXYZ_X);
Gout: G output (standard G component: e.g., CIEXYZ_Y);
Bout: B output (standard B component: e.g., CIEXYZ_Z); and
Kout: K output (CIEXYZ_Y of K component),
a masking coefficient for color conversion in the color category Hue_x is represented by coef [Hue_x], and a constant in the color category Hue_x is represented by const [Hue_x].

For the color category 11 (i.e., tertiary color: CMY mixed color), hue segmentation masking color conversion enhances the color prediction accuracy because the hue largely changes according to the ratio of color components. A detailed description of the hue segmentation masking color conversion is deferred.

As for process gray, an expression that uses the RGB output of the sensor up to a tertiary term may be used in place of linear masking, to reduce the influence of a non-perfect linear relationship between the spectral sensitivity of the RGB output of the in-line sensor and the XYZ chromaticity defined by the CIE. This is an average value of differences in chromaticity values generated between the XYZ chromaticity values obtained by converting the RGB output of the sensor and the XYZ chromaticity values obtained from the spectral reflectance defined by the CIE.

A color difference ($\Delta E$) is calculated after conversion of both the XYZ chromaticity values into L*a*b* as defined by the CIE. Changing the matrix for each patch attribute of the type of colorant in use (i.e., whether the measured patch is a gray scale patch of black alone or a process gray scale patch) reduces the color difference ($\Delta E$) generated between the XYZ chromaticity values obtained by converting the RGB output of the sensor and the XYZ chromaticity values obtained from the spectral reflectance defined by the CIE. This is because changing a matrix A for each patch attribute reduces the influence of nonlinearity in the color-matching function of the spectral sensitivity of the RGB output of the sensor and the XYZ chromaticity defined by the CIE. That is, employing a color conversion method in which the matrix A is set for each patch attribute reduces the color difference generated between the XYZ chromaticity values obtained by converting the RGB output of the sensor and the XYZ chromaticity values obtained from the spectral reflectance defined by the CIE.

The above-mentioned method is premised on that the mixture ratio of CMYK patches is determinable upon patch detection. The image processing apparatus 1 provided with the in-line sensor as described above detects patches in the order of image formation and determines the attribute of the patches detected. Therefore, the above-mentioned method is applicable to the image processing apparatus 1.

A description is herein given of a case in which the RGB output of the in-line sensor is converted into XYZ chromaticity values. The above-mentioned method is effective when color matching functions of two different colorimetric systems have non-linearity.

A description has been given of an example in which the patch attributes are classified into two types: the gray scale patch of black (K) alone and the process gray scale patch of yellow (Y), magenta (M), and cyan (C) mixed color. The attribute classification method is not limited to the above-mentioned combination of colorants.

The RGB output of the in-line sensor is converted into the XYZ chromaticity values by, e.g., a primary conversion system with a matrix, polynomial transformation, a method with a neural network, or a method with a LUT. When the patch attribute is determinable in any way, changing, for each patch attribute, the LUT that is used or the weight of connection between neurons that are used in the neural network reduces the difference generated between the XYZ chromaticity values obtained by converting the RGB output of the in-line sensor and the XYZ chromaticity values obtained from the spectral reflectance defined by the CIE.

As described above, changing, for each patch attribute, various parameters that are used upon conversion of the RGB output of the in-line sensor into the XYZ chromaticity values reduces the difference generated between the XYZ chromaticity values obtained by converting the RGB output of the in-line sensor and the XYZ chromaticity values obtained from the spectral reflectance defined by the CIE. Accordingly, such changing enhances the accuracy of color stabilization control with XYZ chromaticity values.

Figure 14:
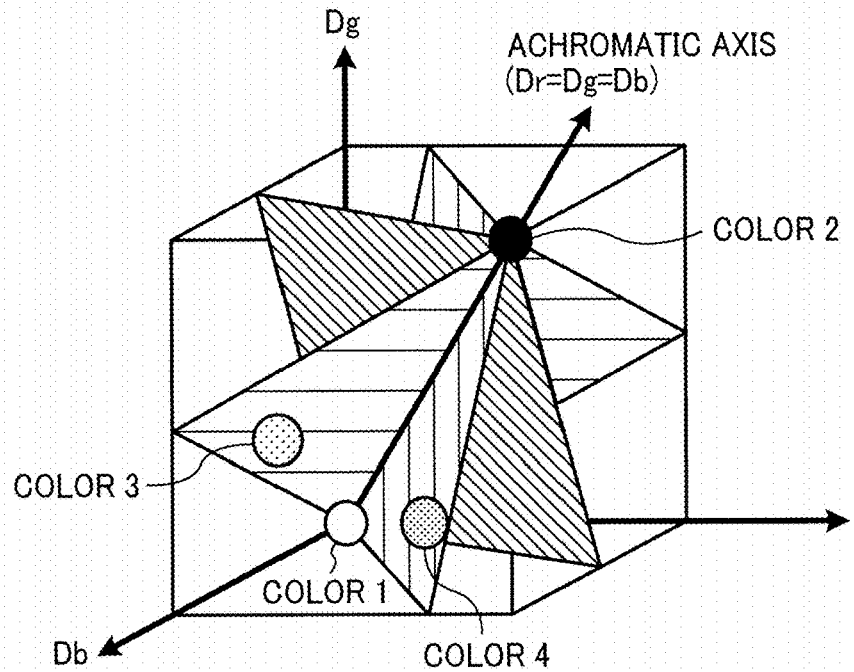
FIG. 14 is a diagram illustrating a method of calculating a masking coefficient in a hue segmentation method according to the first embodiment.

FIG. 14 is a diagram illustrating a method of calculating a masking coefficient in a hue segmentation method according to the first embodiment.

Figure 15:
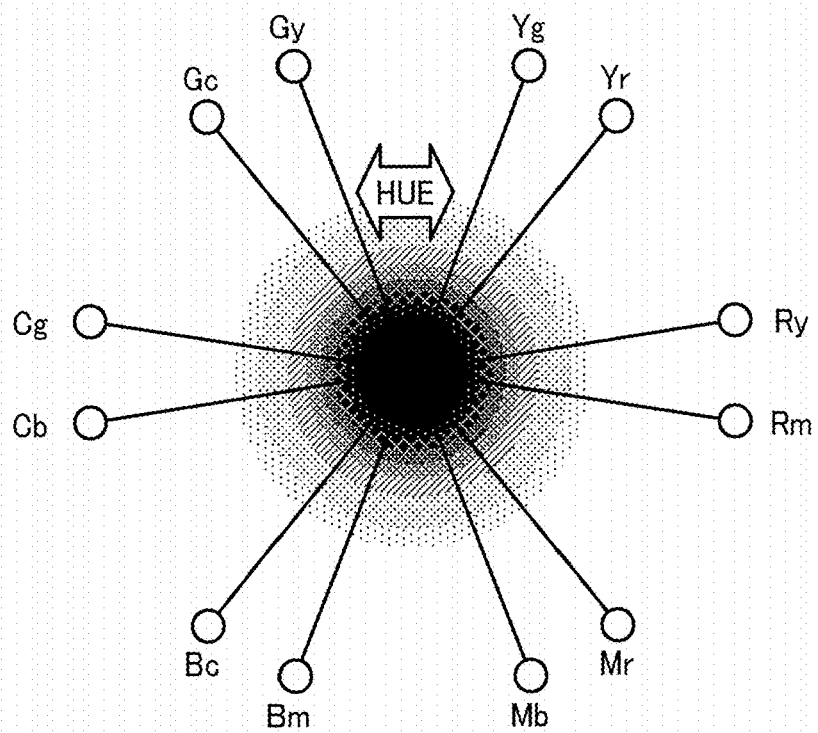
FIG. 15 is a diagram conceptually illustrating hue segmentation in hue segmentation masking color conversion according to the first embodiment.

FIG. 15 is a diagram conceptually illustrating hue segmentation in the hue segmentation masking color conversion according to the first embodiment.

The hue segmentation for the RGB data is performed on planes that radially spread around an achromatic axis (Dr=Dg=Db) with respect to an entire three-dimensional RGB color space as illustrated in FIG. 14. As a specific example of hue determination, image signals (snpr, snpg, and snpb) are converted into hue signals (HUE) and compared with hue boundary values (HUE00 to HUE11). Based on the comparison result, a hue area (of 12 segmented areas) is determined, thereby outputting a hue area signal (Huejo).

A description is now given of generation of color difference signals.

Color difference signals (x, y) are generated from differences of the image signals (snpr, snpg, and snpb) (e.g., G component–R component and B component–G component).

A description is now given of detection of a wide area hue.

A wide area hue signal (HUEH) is generated from the color difference signals (x, y). The wide area hue signal (HUEH) indicates a position at the time when an X-Y signal plane is divided into eight.

A description is now given of rotation of color difference signals.

Color difference signals (XA, YA) are generated according to the wide area hue signal (HUEH). The color difference signals (XA, YA) are coordinates at the time when a color difference signal plane (x, y) is rotated and moved to an area of "HUEH=0".

A description is now given of detection of a narrow area hue.

A narrow area hue signal (HUEL) is generated from the color difference signals (XA, YA). The narrow area hue signal (HUEL) is an inclination of the color difference signal plane coordinates (HUEL/32=YA/XA).

A description is now given of a hue boundary register.

Hue boundary register (HUE00 to HUE11) setting values are output.

A description is now given of determination of a hue area.

Hue boundary signals (HUE00 to HUE11: 8 bits) are compared with a hue signal (HUEHL {HUEH, HUEL}) in magnitude correlation, thereby generating a hue area (HUE).

A description is now given of hue segmentation masking.

A masking operation is performed based on a hue (HUE) obtained by the hue area determination. In the present embodiment, a masking operation from scanner RGB to unified RGB is performed. A product-sum operation of linear masking of 12-hue segmentation is performed independently for each color of RGB and infrared (IR) components. Based on a hue determination signal HUE calculated by the hue area determination, a color correction coefficient and a color correction constant are selected for the masking operation.

Note that a masking coefficient of each hue is determined based on the correspondence of (Dr, Dg, Db, Dir)⇔(Dc, Dm, Dy, Dk) of four points including two points on the achromatic axis and two points on opposite boundary planes. Although an input color and an output color (or corresponding color) are defined as RGB (i.e., scanner vector) and CMYK (i.e., printer vector), respectively, any other attributes of input and output data are settable as appropriate. General-purpose color conversion is possible. A masking operation from RGB to CIEXYZ, sRGB, or the like is also possible.

In FIG. 14, in a case in which the correspondence of (Dr, Dg, Db, Dir)⇔(Dc, Dm, Dy, DK) of the four points is as Expression 40, $$\begin{pmatrix} D1c \\ D1m \\ D1y \\ D1k \end{pmatrix} \Leftrightarrow \begin{pmatrix} D1r \\ D1g \\ D1b \\ 1025 \end{pmatrix} \quad \begin{pmatrix} D2c \\ D2m \\ D2y \\ D2k \end{pmatrix} \Leftrightarrow \begin{pmatrix} D2r \\ D2g \\ D2b \\ 1024 \end{pmatrix} \quad (40)$$

$$\begin{pmatrix} D3c \\ D3m \\ D3y \\ D3k \end{pmatrix} \Leftrightarrow \begin{pmatrix} D3r \\ D3g \\ D3b \\ 1024 \end{pmatrix} \quad \begin{pmatrix} D4c \\ D4m \\ D4y \\ D4k \end{pmatrix} \Leftrightarrow \begin{pmatrix} D4r \\ D4g \\ D4b \\ 1024 \end{pmatrix}$$

the masking coefficient linking the correspondences of the determinants of the four points is obtained by multiplying an inverse matrix of a matrix combining the right sides of colors 1 to 4 and a matrix combining the left sides of the colors 1 to 4 together.

Thus, the masking coefficient is obtained based on a relation of the two points on the achromatic axis (illustrated as white and black points in FIG. 14) and the two points on the opposite boundary planes. Therefore, as a parameter design for color conversion, the right side of Expression 40 is defined as the scanner vector while the left side of Expression 40 is defined as the printer vector, regardless of the attributes of input and output data, thereby obtaining the scanner vector and the printer vector of each segmentation point. Table 1 below is an example of parameters that are used in the hue segmentation masking color conversion according to the present embodiment.

TABLE 1

|  | COLOR | SCANNER VECTOR | PRINTER VECTOR |
| --- | --- | --- | --- |
| ACHROMATIC COLOR | W | (Wr, Wg, Wb) | (Wc, Wm, Wy, Wk) |
| ACHROMATIC COLOR | K | (Kr, Kg, Kb) | (Kc, Km, Ky, Kk) |
| CHROMATIC COLOR | Rm | (Rmr, Rmg, Rmb) | (Rmc, Rmm, Rmy, Rmk) |
| CHROMATIC COLOR | Ry | (Ryr, Ryg, Ryb) | (Ryc, Rym, Ryy, Ryk) |

TABLE 1-continued

| COLOR | | SCANNER VECTOR | PRINTER VECTOR |
|---|---|---|---|
| CHROMATIC COLOR | Yr | (Yrr, Yrg, Yrb) | (Yrc, Yrm, Yry, Yrk) |
| CHROMATIC COLOR | Yg | (Ygr, Ygg, Ygb) | (Ygc, Ygm, Ygy, Ygk) |
| CHROMATIC COLOR | Gy | (Gyr, Gyg, Gyb) | (Gyc, Gym, Gyy, Gyk) |
| CHROMATIC COLOR | Gc | (Gcr, Gcg, Gcb) | (Gcc, Gcm, Gcy, Gck) |
| CHROMATIC COLOR | Cg | (Cgr, Cgg, Cgb) | (Cgc, Cgm, Cgy, Cgk) |
| CHROMATIC COLOR | Cb | (Cbr, Cbg, Cbb) | (Cbc, Cbm, Cby, Cbk) |
| CHROMATIC COLOR | Bc | (Bcr, Bcg, Bcb) | (Bcc, Bcm, Bcy, Bck) |
| CHROMATIC COLOR | Bm | (Bmr, Bmg, Bmb) | (Bmc, Bmm, Bmy, Bmk) |
| CHROMATIC COLOR | Mb | (Mbr, Mbg, Mbb) | (Mbc, Mbm, Mby, Mbk) |
| CHROMATIC COLOR | Mr | (Mrr, Mrg, Mrb) | (Mrc, Mrm, Mry, Mrk) |

In the hue segmentation masking color conversion, the color space has 12 segmentation points constructed of two points for each of the primary colors (i.e., C, M, and Y) and for each of the secondary colors (i.e., R, G, and B) as illustrated in FIG. 15. Therefore, after setting the final scanner vector and printer vector for each of 14 points, including the white and black points on the achromatic axis, as illustrated in Table 1, the masking coefficient is calculated as follows for each hue area. In this case, the continuity at the boundary of each hue area is maintained.

$Rout = coef\_rr[hue]*Rin + coef\_rg[hue]*Gin + coef\_rb[hue]*Bin + const,$ $Gout = coef\_gr[hue]*Rin + coef\_gg[hue]*Gin + coef\_gb[hue]*Bin + const,$ $Bout = coef\_br[hue]*Rin + coef\_bg[hue]*Gin + coef\_bb[hue]*Bin + const,$ and $Kout = coef\_kr[hue]*Rin + coef\_kg[hue]*Gin + coef\_kb[hue]*Bin + const,$ where inputs are represented by:
Rin: R output of scanner (R-component reading of scanner device);
Gin: G output of scanner (G-component reading of scanner device); and
Bin: B output of scanner (B-component reading of scanner device),
outputs are represented by:
Rout: R output (standard R component: e.g., CIEXYZ_X);
Gout: G output (standard G component: e.g., CIEXYZ_Y);
Bout: B output (standard B component: e.g., CIEXYZ_Z); and
Kout: K output (CIEXYZ_Y of K component),
a masking coefficient for color separation in a hue area is represented by coef_[hue], and a constant is represented by const.

Figure 16:
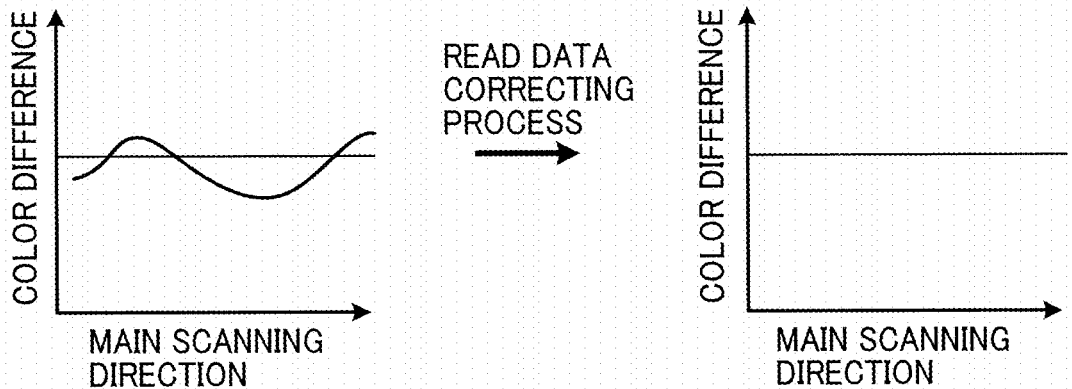
FIG. 16 is a diagram illustrating a relationship between a position in a main scanning direction and variations in readings of an in-line sensor.

Referring now to FIG. 16, a description is now given of a situation to be addressed in a reading device such as an in-line sensor.

FIG. 16 is a diagram illustrating a relationship between a position in a main scanning direction and variations in readings of an in-line sensor.

Specifically, FIG. 16 includes two graphs each illustrating a relationship between the position in the main scanning direction and the color difference between a reference color value and the reading of the in-line sensor. The reading of the in-line sensor is the data indicated when the in-line sensor reads a color pattern having a uniform density. In FIG. 16, a left graph illustrates that the readings of the in-line sensor (or color difference) vary depending on the read position (i.e., position in the main scanning direction) even when the in-line sensor reads a color pattern having a uniform density. Such variation is caused by mechanical features, such as unevenness in illumination (or illumination depth) in the main scanning direction of the in-line sensor or unstable conveyance of recording media. Even a shading correction with a white board disposed in the image processing apparatus 1, for example, may not solve such variation.

To perform accurate color calibration, in the present embodiment, the read data correction process is performed in addition to, e.g., the shading correction. In the read data correction process, the reading (i.e., raw RGB values) of the in-line sensor is corrected according to a read position on the color chart 21. The read data correction process reduces the occurrence of color difference (i.e., variation in readings) in the main scanning direction, as illustrated in a right graph of FIG. 16, thereby enhancing the color calibration accuracy.

Figure 17:
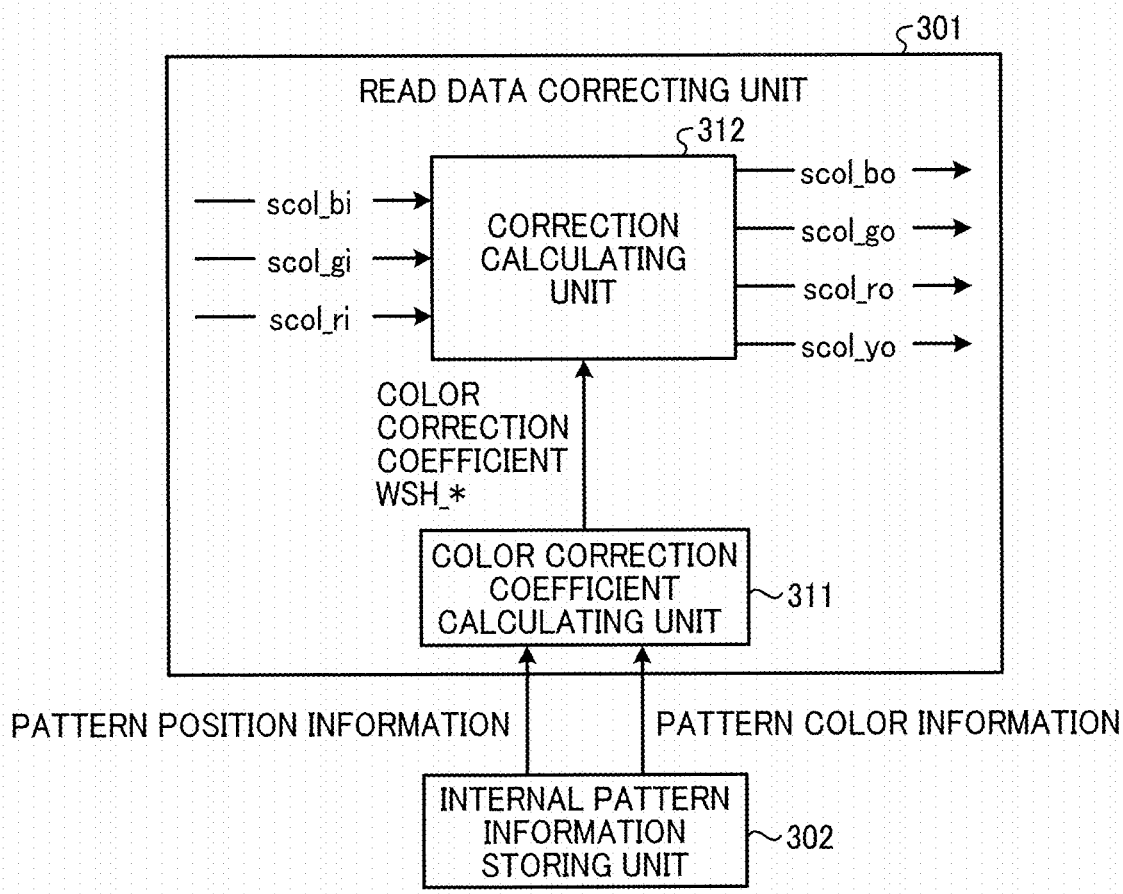
FIG. 17 is a block diagram illustrating a functional configuration of a read data correcting unit according to the first embodiment.

FIG. 17 is a block diagram illustrating a functional configuration of the read data correcting unit 301 according to the first embodiment.

According to the present embodiment, the read data correcting unit 301 includes a color correction coefficient calculating unit 311 and a correction calculating unit 312.

The color correction coefficient calculating unit 311 calculates a color correction coefficient based on the pattern position information and the pattern color information stored in the internal pattern information storing unit 302.

The correction calculating unit 312 calculates corrected RGB values from the raw RGB values by use of the color correction coefficient calculated by the color correction coefficient calculating unit 311.

Figure 18:
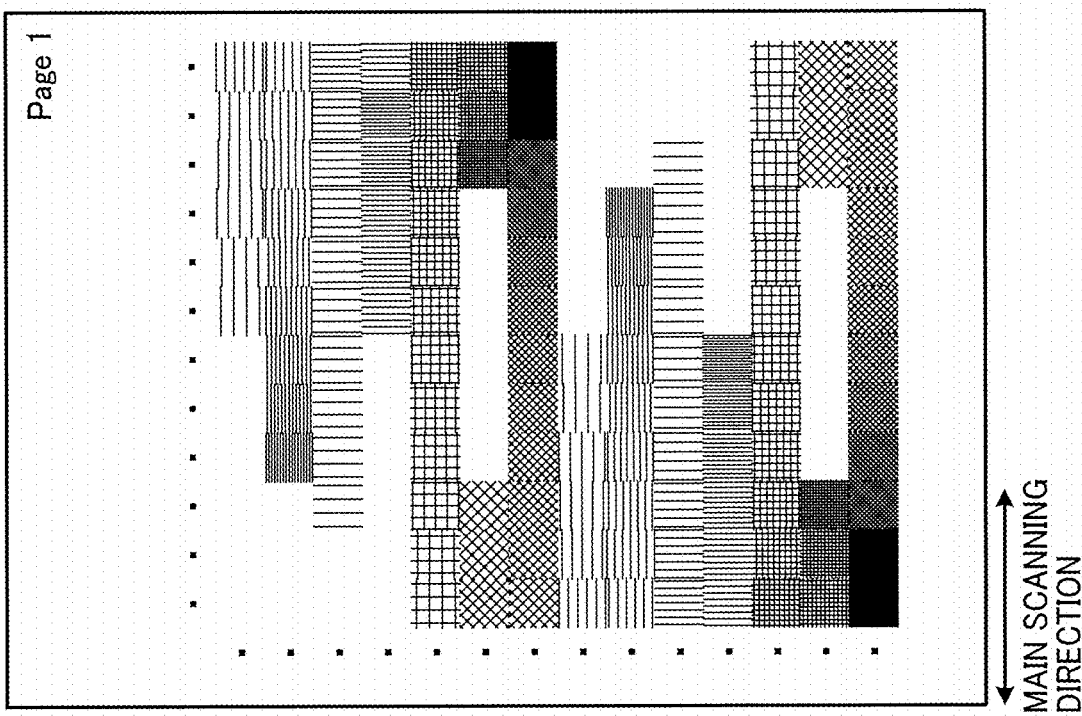
FIG. 18 is a diagram illustrating an internal pattern according to the first embodiment.

FIG. 18 is a diagram illustrating an internal pattern 51 according to the first embodiment.

The internal pattern 51 includes a plurality of patches constructing color gradations of a plurality of tones. The internal pattern 51 illustrated in FIG. 18 is an example of a pattern that is read by the in-line sensor for calibration of output y characteristics for each color of C, M, Y, and K.

A description is now given of the features of the internal pattern 51.

The internal pattern 51 includes patches in 21 tones (including paper white) for each color of C, M, Y, and K. Note that the paper white is a color (in this case, a white color) of a recording medium.

Twelve patches are arranged in the main scanning direction.

Four identical patches (with the same color and tone) are arranged, across a plurality of pages, at different positions both in the main scanning direction and in a sub-scanning direction.

The internal pattern is pre-designed CMYK image data including information that identifies the position of each patch.

Red, green, and blue data (i.e., r_ave0 to r_ave11, g_ave0 to g_ave11, and b_ave0 to b_ave11) having pixel values averaged for each area of the twelve patches aligned in the main scanning direction are input into the correction calculating unit 312.

Specifically, the data input into the correction calculating unit 312 are as below:
r_ave0, r_ave1, . . . , r_ave10, r_ave11;
g_ave0, g_ave1, . . . g_ave10, g_ave11; and
b_ave0, b_ave1, . . . , b_ave10, b_ave11.

Each time when the correction calculating unit 312 performs calculation, the color correction coefficient calculating unit 311 provides the correction calculating unit 312 with one of color correction coefficients: wsh_c0 to wsh_c11; wsh_m0 to wsh_m11; wsh_y0 to wsh_y11; and wsh_k0 to wsh_k11, according to an output color and a main scanning position. Note that, in the present embodiment, the color correction coefficient is a value obtained by dividing a 12-bit integer by 2048 (2^11) as described below.

Specifically, the color correction coefficients include:
wsh_c0, wsh_c1, . . . , wsh_c10, wsh_c11;
wsh_m0, wsh_m1, . . . , wsh_m10, wsh_m11;
wsh_y0, wsh_y1, . . . , wsh_y10, wsh_y11;
wsh_k0, wsh_k1, . . . , wsh_k10, wsh_k11;

The color correction coefficients are 12-bit data: 1-bit integer and 11-bit decimals. The color correction coefficients are set in a range of about 0.7 to about 1.3, for example.

Input data is multiplied by the color correction coefficient for each patch area as described below. In the present example, the correction calculating unit 312 performs correction by multiplying a read channel in a complementary color relationship by the color correction coefficient, for the conversion of corrected data into CMYK image density for the single-color calibration at a subsequent stage. As for Green, different color correction coefficients are used for Magenta and Black. Specifically, a color correction coefficient wsh_m is used for Magenta; whereas a color correction coefficient wsh_k is used for black. Corrected RGB values output from the read data correcting unit 301 are as below:
r_ave0*wsh_c0, r_ave1*wsh_c1, . . . , r_ave10*wsh_c10, r_ave11*wsh_c11;
g_ave0*wsh_m0, r_ave1*wsh_m1, . . . , r_ave10*wsh_m10, r_ave11*wsh_m11;
b_ave0*wsh_y0, r_ave1*wsh_y1, . . . , r_ave10*wsh_y10, r_ave11*wsh_y11;
and
g_ave0*wsh_k0, r_ave1*wsh_k1, . . . , r_ave10*wsh_k10, r_ave11*wsh_k11.

Examples of calculation are as below:
wsh_c0=0.915, wsh_c1=0.897, . . . , wsh_c63=0.875;
r_ave0=179.18, r_ave1=180.23, . . . , r_ave63=181.34; and
r_ave0*wsh_c0=163.95, r_ave1*wsh_c1=161.67, . . . , r_ave63*wsh_c63=158.67.

Figure 19:
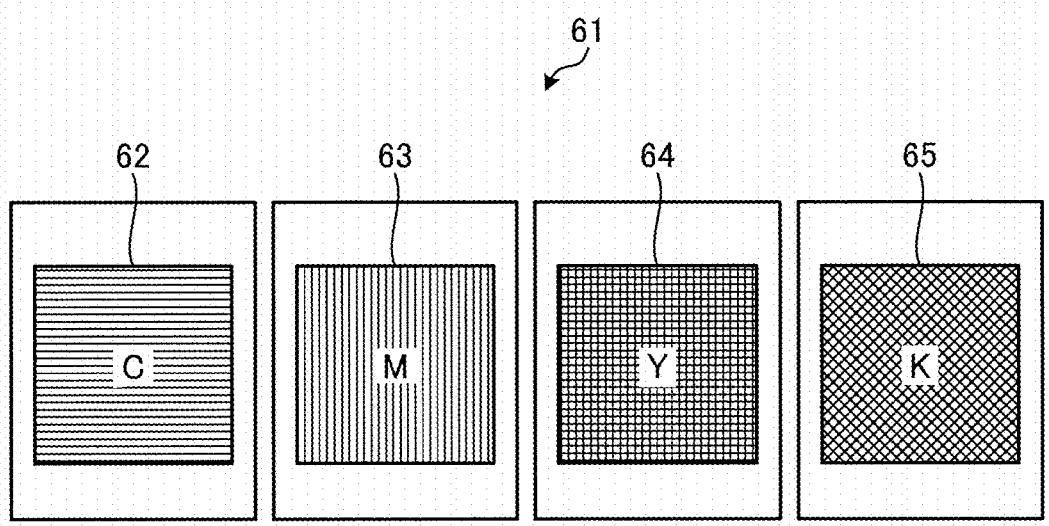
FIG. 19 is a diagram illustrating an evaluation pattern that is used for calculation of a color correction coefficient according to the first embodiment.
Figure 20:
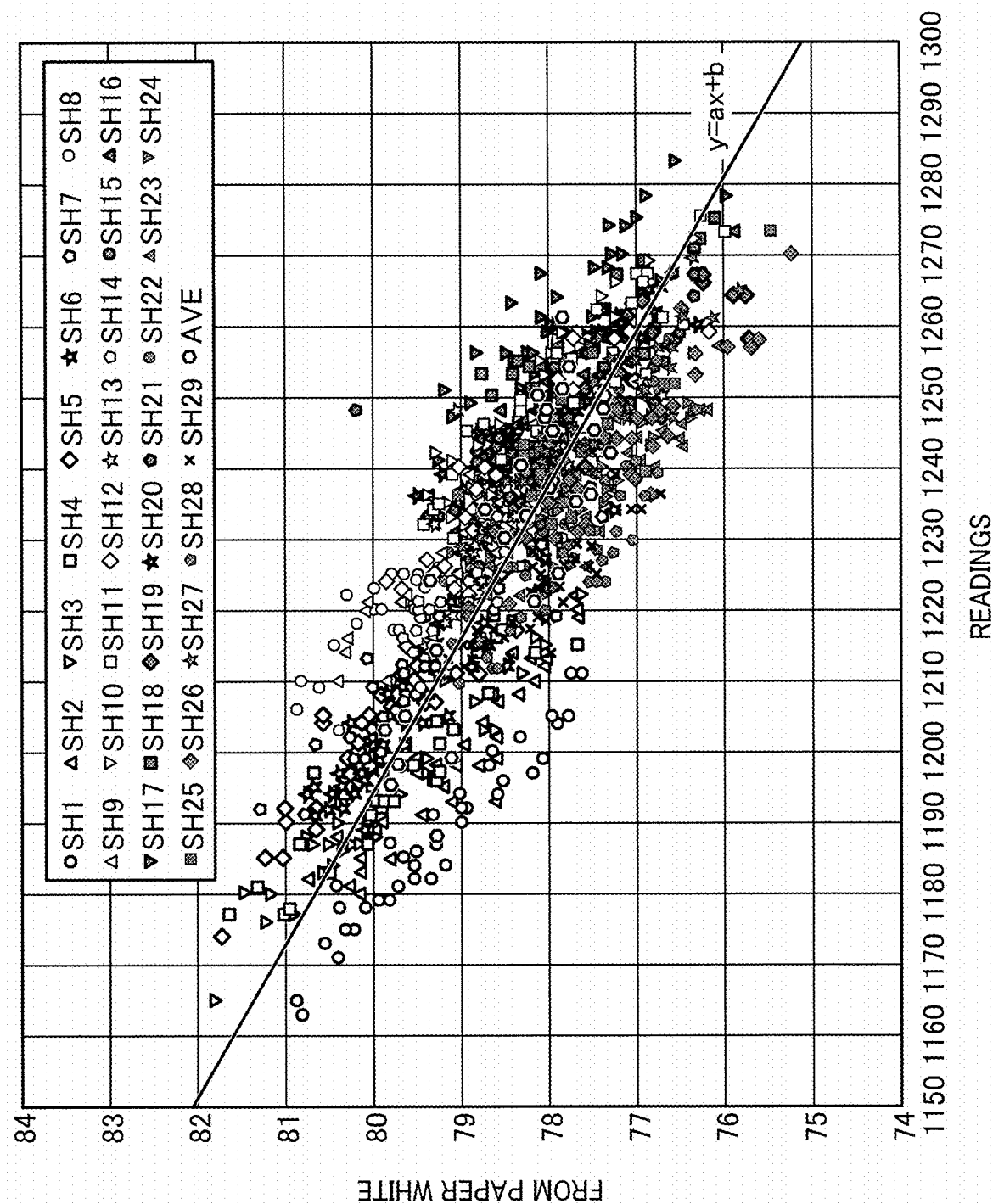
FIG. 20 is a graph illustrating an example of calculation of the color correction coefficient according to the first embodiment.

Referring now to FIGS. 19 and 20, a description is given of calculation of a color correction coefficient.

Based on a comparison result of raw RGB values acquired by reading the internal pattern 51 and colorimetric values (or colorimetric data) acquired by measuring the color of an evaluation pattern described later, the read data correcting unit 301 calculates a color correction coefficient corresponding to a read position upon reading of the internal pattern 51. With the color correction coefficient calculated, the read data correcting unit 301 calculates corrected RGB values.

FIG. 19 is a diagram illustrating an evaluation pattern 61 that is used for calculation of a color correction coefficient according to the first embodiment.

The printing unit 101 of the image processing apparatus 1 outputs the evaluation pattern 61 onto a recording medium. The evaluation pattern 61 includes four reference patches 62 to 65 having solid single colors of C, M, Y, and K, respectively. The in-line sensor and a spectrocolorimeter read color values of the reference patches 62 to 65 at patch intervals of the internal pattern 51 illustrated in FIG. 18.

FIG. 20 is a graph illustrating an example of calculation of the color correction coefficient according to the first embodiment.

Specifically, FIG. 20 illustrates the relationship between the readings of the in-line sensor and the color difference between paper white and the colorimetric value output by the spectrocolorimeter. The readings of the in-line sensor are the data indicated when the in-line sensor reads a complementary color of a certain color. The color correction coefficient calculating unit 311 calculates a color correction coefficient corresponding to an image forming position (i.e., read position) and color information of any one of single colors of C, M, Y, and K, with the input and output relationship obtained by approximating the variation characteristics between the readings and the color difference with a linear equation by, e.g., the least squares method. For example, when y=ax b represents the target characteristics and P (m, n) represents a coordinate value of the reading of the in-line sensor and the color difference at a position on the reference patches 62 to 65, a target value Xt for the read data correction process with respect to the color difference is calculated by Formula 41

$$Xt=(n-b)/a; \quad (41)$$

whereas the color correction coefficient wsh_** is calculated by Formula 42

$$wsh\_**=Xt/m=(n-b)/(a \times m). \quad (42)$$

Since the present example herein described is correction for single process colors (i.e., CMYK), the color information includes four pieces of color information. That is, the relationship between the readings of the in-line sensor and the colorimetric values is obtained for each color of C, M, Y, and K. In the color correction for single process colors (i.e., CMYK), the evaluation pattern 61 is not limited to a solid image. Alternatively, a pattern in a plurality of tones including a halftone may be used as an evaluation pattern. In such a case, a color correction coefficient corresponding to a tone level may be calculated. Alternatively, the tones may be averaged to calculate a color correction coefficient common to all the tones.

With regard to correction of readings of secondary or greater colors that are used for mixed color calibration, the color correction coefficient is calculated for the RGB reading by use of the complementary color and a distribution of colorimetric values (i.e., tri stimulus values) and the readings of the in-line sensor at different patch formation positions based on the following relationship, instead of the color difference from paper white:
sensor reading R: x (CIEXYZ);
sensor reading G: y (CIEXYZ); and
sensor reading B: z (CIEXYZ).

For example, for correction of the reading of red, which is a secondary color created by mixing M and Y, an evaluation pattern is formed with solid images of M (100%) and Y (100%) in a layout of the evaluation pattern 61 illustrated in FIG. 19, assuming the color chart 21 of colors for mixed-color calibration as illustrated in FIG. 8. The color correction coefficient calculating unit 311 receives red, green, and blue data (i.e., r_ave0 to r_ave9, g_ave0 to g_ave9, and b_ave0 to b_ave9) having pixel values averaged for each area of the ten patches 81 to 85 aligned in the main scanning direction. The color correction coefficient calculating unit 311 then calculates a color correction coefficient from the reading of the in-line sensor and the colorimetric value as described above.

Specifically, the data input into the color correction coefficient calculating unit 311 are as below:
r_ave0, r_ave1, . . . , r_ave8, r_ave9;
g_ave0, g_ave1, . . . , g_ave8, g_ave9; and
b_ave0, b_ave1, . . . , b_ave8, b_ave9.

Each time when the correction calculating unit 312 performs calculation, the color correction coefficient calculating unit 311 provides the correction calculating unit 312 with one of color correction coefficients: wsh_rr0 to wsh_rr9; wsh_rg0 to wsh_rg9; and wsh_rb0 to wsh_rb9, according to an output color and a main scanning position. Note that, in the present embodiment, the color correction coefficient is a value obtained by dividing a 12-bit integer by 2048 (2^11) as described below.

Specifically, the color correction coefficients include:
wsh_rr0, wsh_rr1, . . . , wsh_rr8, wsh_rr9;
wsh_rg0, wsh_rg1, . . . , wsh_rg8, wsh_rg9; and
wsh_rb0, wsh_rb1, . . . , wsh_rb8, wsh_rb9.

Input data is multiplied by the color correction coefficient for each patch area as described below. In the present example, the correction calculating unit 312 performs correction by multiplying an RGB read channel by the color correction coefficient, for the conversion of corrected data into CIELAB (or CIEXYZ) for a secondary color: red pattern (i.e., color category 6: MY mixed color) of the mixed-color calibration at a subsequent stage.

Corrected RGB values of the color category 6 include:
r_ave0*wsh_rr0, r_ave1*wsh_rr1, . . . , r_ave8*wsh_rr8, r_ave9*wsh_rr9;
g_ave0*wsh_rg0, g_ave1*wsh_rg1, . . . , g_ave8*wsh_rg8, g_ave9*wsh_rg9; and
b_ave0*wsh_rb0, b_ave1*wsh_rb1, . . . , b_ave8*wsh_rb8, b_ave9*wsh_rb9.

As described above, according to the present embodiment, the read data correcting unit 301 corrects, according to the read position, readings (i.e., raw RGB values) of the internal pattern 51 obtained from the in-line sensor. Then, the calibrating unit 103 performs calibration with the readings thus corrected according to the read position, in short, with corrected RGB values. Accordingly, the present embodiment enhances the calibration accuracy. Although the variation in readings in the main scanning direction is corrected as described above in the present embodiment, the variation in readings in the sub-scanning direction caused mainly by the unstable conveyance of recording media is similarly correctable.

Now, a description is given of a second embodiment of the present disclosure. Like reference numerals are given to constituent elements having the same or similar functions and advantages as those of the first embodiment. Redundant descriptions thereof are herein omitted unless otherwise required.

The second embodiment is different from the first embodiment in how to generate the color chart 21. The image processing apparatus 1 of the second embodiment includes a color chart generating unit 201, instead of the color chart generating unit 112 illustrated in FIG. 5.

Figure 21:
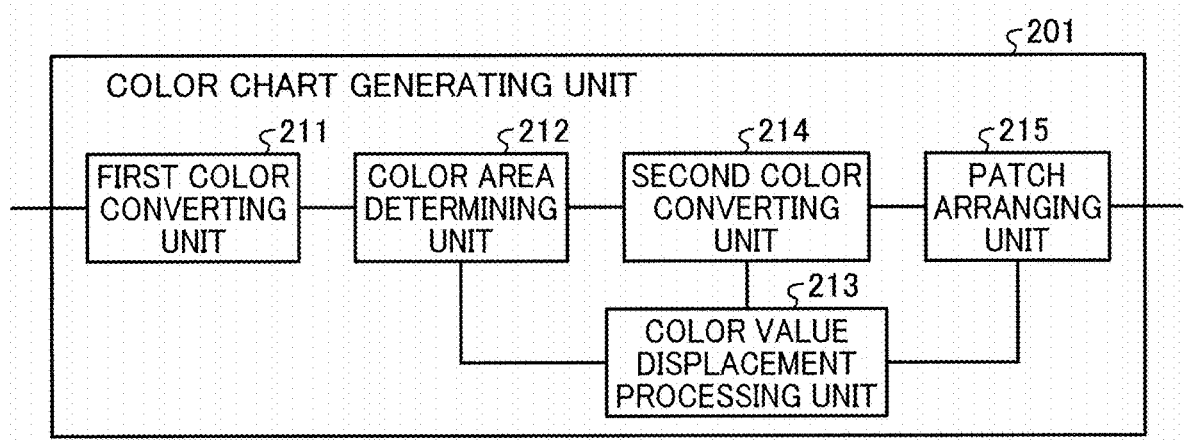
FIG. 21 is a block diagram illustrating a functional configuration of a color chart generating unit according to a second embodiment of the present disclosure.
Figure 22:
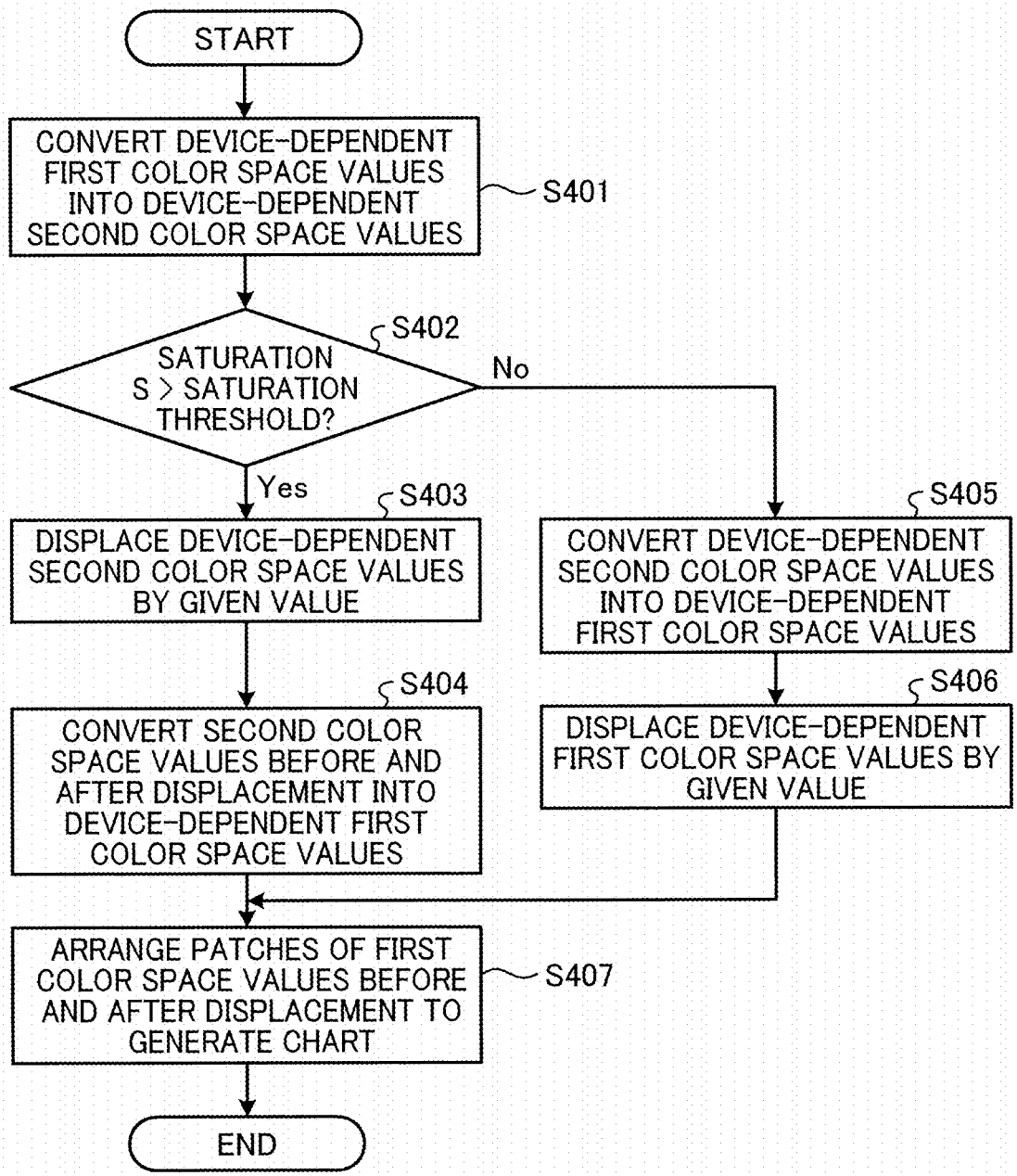
FIG. 22 is a flowchart of a process to generate a color chart according to the second embodiment.

Referring now to FIGS. 21 and 22, a description is given of the generation of a color chart.

FIG. 21 is a block diagram illustrating a functional configuration of the color chart generating unit 201 according to the second embodiment.

The color chart generating unit 201 includes a first color converting unit 211, a color area determining unit 212, a color value displacement processing unit 213, a second color converting unit 214, and a patch arranging unit 215.

Colors near gray is insensitive to displacement of the HSL values, causing difficulties in displacing the patches within an appropriate range and outputting the patches thus displaced. To address such a situation, the color chart generating unit 201 according to the present embodiment displaces a color of a patch with CMYK values in an achromatic area.

Like the first color converting unit 121 according to the first embodiment, the first color converting unit 211 converts CMY values among CMYK values into HSL values. As described above, the CMYK values serve as device-dependent first color space values. The HSL values serve as device-dependent second color space values.

The color area determining unit 212 determines whether a target area for color value displacement is a chromatic color area or an achromatic color area.

When the target area is a chromatic color area, the color value displacement processing unit 213 displaces the HSL values by a given value. On the other hand, when the target area is an achromatic area, the color value displacement processing unit 213 displaces the CMYK values by a given value.

The second color converting unit 214 inversely converts the displaced HSL values into CMYK values.

The patch arranging unit 215 arranges, in a page, patches using the CMYK values (i.e., inverse conversion result), to generate the color chart 21.

FIG. 22 is a flowchart of a process to generate the color chart 21 according to the second embodiment.

In step S401, the first color converting unit 211 converts CMY values among CMYK values (i.e., device-dependent first color space values) into HSL values (i.e., device-dependent second color space values).

In step S402, the color area determining unit 212 determines whether the saturation S is greater than a saturation threshold.

When the saturation S is greater than the saturation threshold, that is, when the target area is a chromatic area (YES in step S402), the color value displacement processing unit 213 displaces the HSL values (i.e., device-dependent second color space values obtained by the conversion) by a given value in step S403.

In step S404, the second color converting unit 214 inversely converts the HSL values (i.e., device-dependent second color space values) before and after the displacement into CMY values (i.e., device-dependent first color space values). As for K, the original value remains unchanged.

Subsequently, in step S407, the patch arranging unit 215 arranges, in a page, patches of the CMY values (i.e., first color space values) before and after the displacement, to generate the color chart 21.

On the other hand, when the saturation S is not greater than the saturation threshold, that is, when the target area is an achromatic area (NO in step S402), the second color converting unit 214 inversely converts the HSL values (i.e., device-dependent second color space values obtained by the conversion in step S401) into CMY values (i.e., device-dependent first color space values) in step S405.

In step S406, the color value displacement processing unit 213 displaces, by a given value, the CMY values (i.e., device-dependent first color space values obtained by the conversion).

In step S407, the patch arranging unit 215 arranges, in a page, patches of the CMY values (i.e., first color space values) before and after the displacement, to generate the color chart 21.

Referring now to FIG. 23, a description is given of a patch group.

FIG. 23 is a table of a patch group according to the second embodiment.

In FIG. 23, the "Patch No." column indicates patch numbers included in each correction control point. Each of rows 91 to 99 indicates color values, in the CMYK space, of a patch output for each correction control point. FIG. 23 illustrates nine patches constructed of one patch with original color values and eight patches obtained by displacing at least one of M and Y components of C0, Y0, M0, and K0, which are conversion results of each correction control point, by a given displacement amount a in a range of 1 to 255. Such patches constructed of CMYK values before and after displacement are arranged in the color chart 21.

Figure 24:
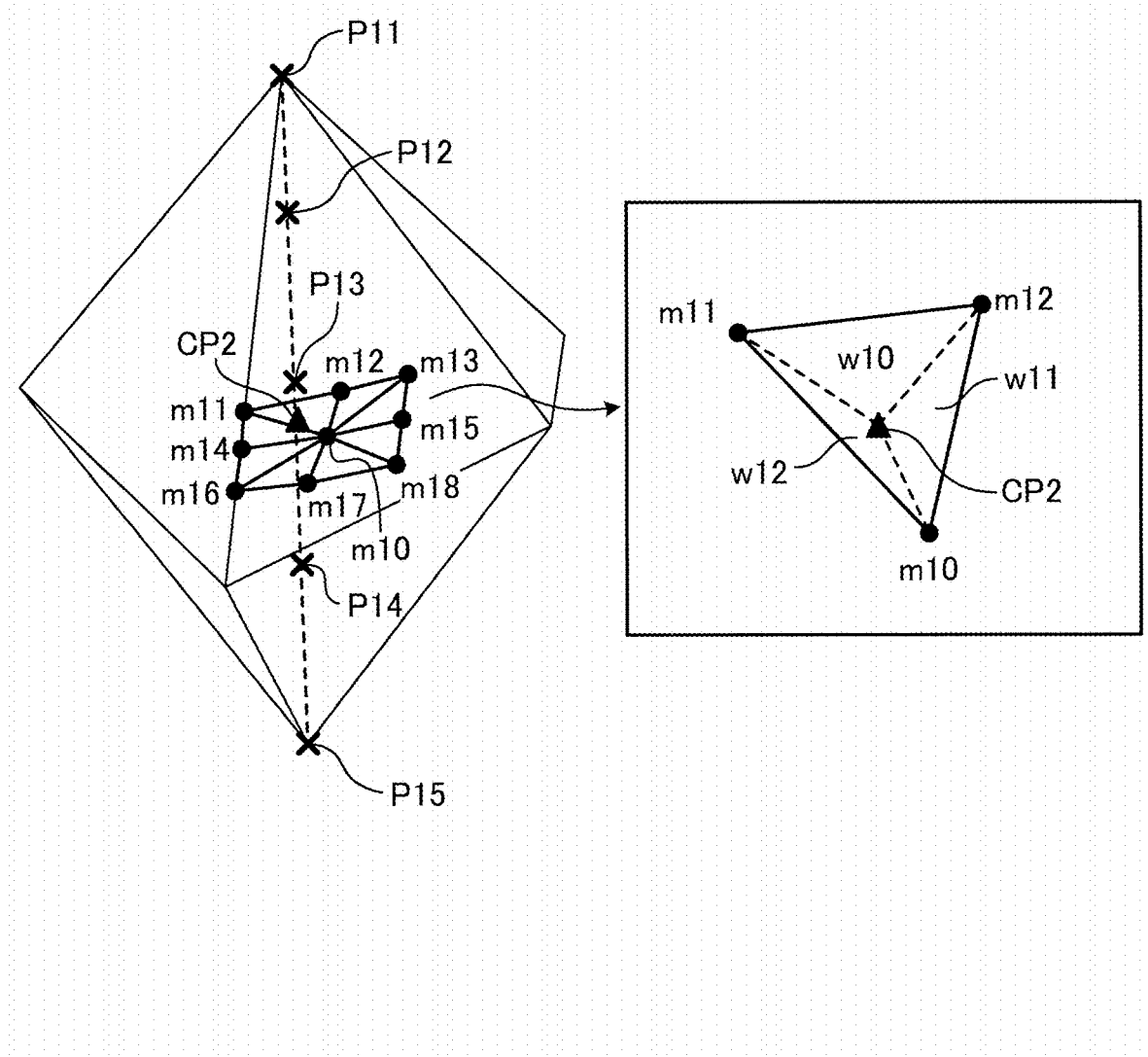
FIG. 24 is a diagram conceptually illustrating an example of generation of a correction parameter according to the second embodiment.

Referring now to FIG. 24, a description is given of generation of a correction parameter.

FIG. 24 is a diagram conceptually illustrating an example of generation of a correction parameter according to the second embodiment.

FIG. 24 illustrates a Lab space. Points P11 to P15 indicate Lab values into which CMYK values of correction control points are converted by use of the output profile 25. Points m10 to m18 indicate colorimetric values of a patch group for a correction control point of the point P13.

Input and output values of a correction parameter is obtainable by selecting three points from colorimetric values and forming a three-dimensional plane, as in the case described above with reference to FIG. 10. Specifically, while moving the CMYK values from the point P13 to the point P14, the correction parameter generating unit 113 performs color conversion by use of the output profile 25 to obtain Lab values. The correction parameter generating unit 113 calculates, at any time, the distance between each Lab values and the plane to determine a point CP2 as a minimum distance point. That is, the distance between the point CP2 and the plane is the minimum. The correction parameter generating unit 113 sets the CMYK values of the minimum distance point as an input value of the correction parameter. Upon determining the point CP2, the correction parameter generating unit 113 acquires the Lab values of the point CP2 together with the Lab values of the colorimetric values of the patches surrounding the point CP2. The correction parameter generating unit 113 performs interpolation by use of weights w10, w11, and w12, which are illustrated in FIG. 24 as areas defined by lines drawn from the point CP2 to the points m10, m11, and m12 indicating the Lab values of the colorimetric values. Specifically, the correction parameter generating unit 113 acquires CMY values of the patches surrounding the point CP2. The correction parameter generating unit 113 performs interpolation by use of the weights w10, w11, and w12, thereby acquiring an output value of the correction parameter.

As for K, since the color value of each patch is not displaced, the original value is the output value.

As described above, in the present embodiment, the correction parameter for a color near gray is obtained by use of a patch group displaced with the CMYK values instead of the HSL values. Accordingly, the present embodiment further enhances the eligibility of the correction parameter.

The embodiments of the present disclosure enhance the calibration accuracy.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings. Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image processing apparatus, comprising:
an image forming device configured to form a first pattern on a recording medium, the first pattern including a plurality of patches in a plurality of tones;
a reading device configured to read the first pattern; and
circuitry configured to
acquire read data of the first pattern from the reading device, the read data including red, green, and blue (RGB) color space values;
correct the read data based on information indicating a relationship between a color and a position in the first pattern to reduce variation in readings due to a read position of the first pattern;
convert the read data corrected into device-independent data; and
adjust a color reproduction characteristic of the image forming device based on the device-independent data, wherein the image forming device is further configured to form a second pattern including four reference patches of colors of cyan, magenta, yellow, and black, respectively, on the recording medium, and wherein, based on a comparison of the read data of the first pattern with colorimetric data of the second pattern, the circuitry is further configured to calculate a color correction coefficient corresponding to the read position of the first pattern and correct the read data with the calculated color correction coefficient.

2. The image processing apparatus according to claim 1, wherein the reading device is further configured to read a white color of the recording medium, and wherein the circuitry is further configured to acquire read data of the white color of the recording medium from the reading device, and calculate the color correction coefficient based on the read data of the white color of the recording medium.

3. The image processing apparatus according to claim 1, wherein the circuitry is further configured to generate a color chart and acquire colorimetric data of the color chart to adjust the color reproduction characteristic.

4. The image processing apparatus according to claim 3, wherein the circuitry is further configured to:

convert a first color space value into a second color space value;

displace, by a given value, the second color space value;

convert the second color space value before displacement and the second color space value after displacement into the first color space value before displacement and the first color space value after displacement; and generate the color chart with the first color space value before displacement and the first color space value after displacement.

5. The image processing apparatus according to claim 4, wherein the first color space value includes cyan, magenta, yellow, and black (CMYK) color space values, and wherein the second color space value includes hue, saturation, and lightness (HSL) color space values.

6. The image processing apparatus according to claim 3, wherein, in an achromatic area, the circuitry is further configured to displace a first color space value by a given value, and wherein the circuitry is further configured to generate the color chart with the first color space value before displacement and the first color space value after displacement.

7. The image processing apparatus according to claim 6, wherein the first color space value includes cyan, magenta, yellow, and black (CMYK) color space values.

8. The image processing apparatus according to claim 1, wherein the read position is a position in a main scanning direction of the reading device.

9. The image processing apparatus according to claim 8, wherein the reading device includes an in-line sensor.

10. An image processing method, comprising: reading a first pattern on a recording medium to acquire read data including red, green, and blue (RGB) color space values, the first pattern including a plurality of patches in a plurality of tones;

reading a second pattern on the recording medium to acquire colorimetric data, the second pattern including four reference patches of colors of cyan, magenta, yellow, and black, respectively, correcting the read data based on information indicating a relationship between a color and a position in the first pattern to reduce variation in readings due to a read position of the first pattern;

converting the read data corrected into device-independent data; adjusting a color reproduction characteristic of an image forming device based on the device-independent data;

and based on a comparison of the read data of the first pattern with the colorimetric data of the second pattern, calculating a color correction coefficient corresponding to the read position of the first pattern and correcting the read data with the calculated color correction coefficient.

11. A non-transitory, computer-readable storage medium storing computer-readable program code that causes a computer to execute an image processing method, the method comprising:

reading a first pattern on a recording medium to acquire read data including red, green, and blue (RGB) color space values, the first pattern including a plurality of patches in a plurality of tones;

reading a second pattern on the recording medium to acquire colorimetric data, the second pattern including four reference patches of colors of cyan, magenta, yellow, and black, respectively;

correcting the read data based on information indicating a relationship between a color and a position in the first pattern to reduce variation in readings due to a read position of the first pattern;

converting the read data corrected into device-independent data; adjusting a color reproduction characteristic of an image forming device based on the device-independent data; and based on a comparison of the read data of the first pattern with the colorimetric data of the second pattern, calculating a color correction coefficient corresponding to the read position of the first pattern and correcting the read data with the calculated color correction coefficient.

* * * * *